United States Patent
Hirokubo

(10) Patent No.: US 10,976,538 B2
(45) Date of Patent: Apr. 13, 2021

(54) OPTICAL FILTER DEVICE, OPTICAL MODULE, ELECTRONIC APPARATUS, AND MEMS DEVICE

(71) Applicant: Seiko Epson Corporation, Tokyo (JP)

(72) Inventor: Nozomu Hirokubo, Fujimi (JP)

(73) Assignee: Seiko Epson Corporation

( * ) Notice: Subject to any disclaimer, the term of this patent is extended or adjusted under 35 U.S.C. 154(b) by 58 days.

(21) Appl. No.: 15/886,169

(22) Filed: Feb. 1, 2018

(65) Prior Publication Data

US 2018/0157026 A1     Jun. 7, 2018

Related U.S. Application Data

(63) Continuation of application No. 14/340,777, filed on Jul. 25, 2014, now abandoned.

(30) Foreign Application Priority Data

Jul. 26, 2013    (JP) ................................ 2013-155345

(51) Int. Cl.
     *G02B 27/00*        (2006.01)
     *G02B 26/00*        (2006.01)

(52) U.S. Cl.
     CPC ................................. *G02B 26/001* (2013.01)

(58) Field of Classification Search
     CPC ................................. G01J 3/26; G02B 26/001
     USPC .................. 359/578, 260, 579; 356/450, 454
     See application file for complete search history.

(56) References Cited

U.S. PATENT DOCUMENTS

| | | | |
|---|---|---|---|
| 3,040,583 A | | 6/1962 | Post |
| 5,798,677 A | * | 8/1998 | Cook ................. H01P 1/20363 29/600 |
| 7,196,796 B2 | * | 3/2007 | Moriya ................ G01J 9/0246 356/454 |
| 7,420,738 B2 | * | 9/2008 | Verghese ................. G01J 3/26 359/260 |
| 8,378,300 B2 | | 2/2013 | Inada et al. |
| 2003/0072009 A1 | | 4/2003 | Domash et al. |
| 2003/0137672 A1 | | 7/2003 | Moriya et al. |
| 2004/0027671 A1 | * | 2/2004 | Wu ............................ G01J 3/26 359/578 |
| 2006/0220045 A1 | * | 10/2006 | Doan .................... B81B 7/0048 257/98 |
| 2007/0097479 A1 | | 5/2007 | Yasuda |
| 2007/0242358 A1 | | 10/2007 | Lin et al. |

(Continued)

FOREIGN PATENT DOCUMENTS

| | | |
|---|---|---|
| JP | 05-110960 B2 | 4/1993 |
| JP | 2003-516634 A | 5/2003 |

(Continued)

*Primary Examiner* — Audrey Y Chang
(74) *Attorney, Agent, or Firm* — Harness, Dickey & Pierce, P.L.C.

(57) ABSTRACT

An optical filter device includes a wavelength variable interference filter that has a fixed substrate provided with a fixed reflective film and a movable substrate provided with a movable reflective film, a casing that has an inner space for storing the wavelength variable interference filter therein, and a fixation portion that fixes the wavelength variable interference filter to the casing. In addition, the fixation portion is provided between a side surface of the fixed substrate and an inner surface of the casing.

17 Claims, 17 Drawing Sheets

(56) References Cited

U.S. PATENT DOCUMENTS

| | | |
|---|---|---|
| 2008/0062426 A1 | 3/2008 | Yoshida |
| 2009/0309203 A1* | 12/2009 | Seppala ................ B81B 7/0038 |
| | | 257/682 |
| 2012/0154915 A1* | 6/2012 | Hirokubo ............. G02B 26/001 |
| | | 359/578 |
| 2012/0206731 A1* | 8/2012 | Sano ........................ G01J 3/26 |
| | | 356/450 |
| 2013/0208359 A1 | 8/2013 | Matsuno et al. |
| 2014/0285895 A1 | 9/2014 | Saito et al. |
| 2014/0340686 A1 | 11/2014 | Sano et al. |
| 2016/0085065 A1 | 3/2016 | Sano et al. |

FOREIGN PATENT DOCUMENTS

| | | |
|---|---|---|
| JP | 2005-510756 A | 4/2005 |
| JP | 2007-127445 A | 5/2007 |
| JP | 2008-070163 A | 3/2008 |
| JP | 2011-066350 A | 3/2011 |
| JP | 2012-168438 A | 9/2012 |
| JP | 2013-167701 A | 8/2013 |
| JP | 2014-186199 A | 10/2014 |
| WO | WO-2001-043181 A1 | 6/2001 |

* cited by examiner

OPTICAL FILTER DEVICE, OPTICAL MODULE, ELECTRONIC APPARATUS, AND MEMS DEVICE

CROSS-REFERENCE TO RELATED APPLICATIONS

This application is a continuation of U.S. patent application Ser. No. 14/340,777, filed on Jul. 25, 2014, which claims priority to Japanese Patent Application No. 2013-155345, filed on Jul. 26, 2013. The disclosures of the above applications are incorporated by reference in their entireties.

BACKGROUND

1. Technical Field

The present invention relates to an optical filter device, an optical module, an electronic apparatus, and a MEMS device.

2. Related Art

In the related art, various Micro Electro Mechanical System (MEMS) elements are known, such as an interference filter in which reflective films are respectively disposed on surfaces of a pair of substrates facing each other so that the reflective films face each other across a predetermined gap, a mirror element in which a reflective film is disposed on a substrate, or a piezoelectric vibration element in which a piezoelectric body such as a quartz crystal vibrator element is disposed on a substrate. In addition, a MEMS device is known in which a MEMS element is stored in a storage container (for example, refer to JP-A-2008-70163).

JP-A-2008-70163 discloses an infrared type gas detector (optical filter device) which includes a package (casing) provided with a plate-shaped pedestal and a cylindrical cap. In this casing, an outer circumferential part of a base substrate and one cylindrical end of the cap are connected to each other through welding or adhesion, and a space for storing a Fabry-Perot filter (interference filter) is provided between the base substrate and the cap. The interference filter is adhered and fixed to a lower surface side of a substrate forming the interference filter.

As described above, the interference filter disclosed in JP-A-2008-70163 is adhered and fixed to the lower surface side of the substrate, and is in close contact with an adhesive in a surface direction perpendicular to a thickness direction of the substrate. Since the adhesive typically contracts when cured, stress related to the contraction is applied to the substrate. For this reason, there is a concern that the lower surface of the substrate may receive the stress centering on the adhesion position in the surface direction, and thus the substrate may be deflected. If the substrate is deflected, there is a problem in that reflective films provided on the substrate are distorted, or a dimension of a gap between the reflective films changes, and thus the spectral accuracy of the interference filter deteriorates.

Also in the above-described various MEMS devices, if deflection occurs in a substrate forming the MEMS element, there is a problem in that a performance of the MEMS element deteriorates due to an influence of the deflection.

SUMMARY

An advantage of some aspects of the invention is to provide an optical filter device, an optical module, an electronic apparatus, and a MEMS device capable of minimizing performance deterioration.

An aspect of the invention is directed to an optical filter device including an interference filter that includes a first reflective film, a second reflective film facing the first reflective film, and a substrate provided with either of the first reflective film and the second reflective film; a casing that has an inner space for storing the interference filter therein; and a fixation portion that fixes the interference filter to the casing, in which the fixation portion is provided between a side surface of the substrate in a thickness direction of the substrate and the casing.

Various adhesives may be exemplified as the fixation portion. Here, typically, a dimension in the thickness direction of the substrate is considerably smaller than a dimension in a plane direction perpendicular to the thickness direction. Therefore, rigidity (resistance to deflection) in the thickness direction of the substrate is lower than rigidity in the plane direction. For this reason, as described above, if the fixation portion is provided on a substrate surface perpendicular to the side surface, such as a lower surface of the substrate, there is a concern that the substrate may be deflected by stress applied from the fixation portion.

In contrast, according to the aspect of the invention, the substrate of the interference filter is fixed to the casing by the fixation portion provided on the side surface. For this reason, the fixation portion is provided on the side surface having higher rigidity to deflection than that of the substrate surface, and thus there is almost no influence of stress. Therefore, it is possible to minimize deflection of the substrate due to a contraction stress of the fixation portion or a linear expansion coefficient difference between the substrate and the fixation portion. Accordingly, it is possible to minimize distortion of the reflective film provided on the substrate or a change in dimensions of a gap between reflective films, and thus to prevent a reduction in spectral accuracy of the interference filter.

In the optical filter device of the aspect of the invention, it is preferable that the interference filter includes a first substrate provided with the first reflective film and a second substrate facing the first substrate and provided with the second reflective film as the substrate, and the fixation portion is provided on the side surface of either of the first substrate and the second substrate.

According to this configuration, the interference filter includes the first substrate and the second substrate. The first substrate and the second substrate are disposed so as to face each other. In this configuration, if the fixation portion is provided on both side surfaces of the first substrate and the second substrate, there is a concern that parallelism between the first substrate and the second substrate may not be maintained, and a gap dimension between the reflective films may change since a stress from the fixation portion is applied in contact and separation directions of the first substrate and the second substrate.

In contrast, according to the configuration described above, since the fixation portion is provided on the side surface of either of the first substrate and the second substrate, it is possible to maintain parallelism between the substrates and also to prevent a change in dimensions of the gap between the reflective films, and thus to maintain spectral accuracy of the interference filter.

In the optical filter device of the aspect of the invention, it is preferable that one of the first substrate and the second substrate includes a projecting portion that projects more than the other substrate in a plan view in which the substrates are viewed from the thickness direction, and the fixation portion is provided at the projecting portion.

According to this configuration, one substrate has the projecting portion which projects more than the other substrate. In addition, the fixation portion is provided at the projecting portion. Accordingly, it is possible to prevent the fixation portion from being provided on both of the first substrate and the second substrate, and thus to more reliably provide the fixation portion only on the side surface of one substrate. Therefore, it is possible to more reliably maintain parallelism between the substrates as described above.

In the optical filter device of the aspect of the invention, it is preferable that the second substrate includes a movable portion provided with the second reflective film and a holding portion holding the movable portion in a displaceable manner in the thickness direction, and the fixation portion is provided on the side surface of the first substrate.

According to this configuration, the second substrate includes the holding unit which holds the movable portion in a displaceable manner in the thickness direction. This interference filter allows a dimension of a gap (hereinafter, also referred to as a gap dimension) formed between the first reflective film and the second reflective film to be changed by displacing the movable portion in the thickness direction by using the holding portion. Meanwhile, in the interference filter, since the holding unit is provided on the second substrate, rigidity of the first substrate in the substrate thickness direction is smaller than rigidity of the second substrate in the substrate thickness direction. Therefore, if the fixation portion is provided on the second substrate, there is a concern that the second substrate may be deflected due to a stress of the fixation portion. In contrast, in the configuration described above, since the fixation portion is provided on the first substrate having higher rigidity than that of the second substrate, it is possible to minimize the occurrence of deflection in the substrate and thus to prevent deterioration in spectral accuracy of the interference filter.

In the optical filter device of the aspect of the invention, it is preferable that a part of the side surface forms a planar first side surface, and the fixation portion is provided on the first side surface.

According to this configuration, the substrate has the planar first side surface at least at a part of the side surface, and the fixation portion is provided on the first side surface. In this configuration, after a member such as an adhesive for forming the fixation portion is disposed on the first side surface, the fixation portion is formed in a state in which the first side surface of the substrate is pressed against an inner wall or the like of the casing. At this time, the planar first side surface comes into contact with an inner surface of the casing at two or more locations or the entire surface, and thus a fixation position of the substrate for the casing is determined. Here, in a case where the entire side surface is curved, when a protrusion or the like for alignment is provided, a shape of the protrusion is determined in consideration of the curved shape of the side surface. In contrast, even in a case where the protrusion is provided on the planar first side surface, a dimension or the like of the protrusion is easily set. In addition, even in a case where the casing inner surface is formed to be planar, alignment is easily performed. From the above description, since the first side surface is provided, the substrate is easily aligned, and thus the substrate can be fixed to the casing while easily performing the alignment. Therefore, it is possible to easily design the optical filter device or to improve assembly efficiency.

In the optical filter device of the aspect of the invention, it is preferable that the substrate includes an electric component portion that is provided with a connection terminal which is electrically connected to a casing side terminal provided in the casing, at a part along an outer circumferential edge of the substrate, in a plan view in which the substrate is viewed from a substrate thickness direction, and the first side surface is a side surface of the electric component portion.

In this configuration, the side surface of the electric component portion becomes a first side surface on which the fixation portion is provided. Therefore, since the side surface of the electric component portion is fixed to the casing by the fixation portion, it is possible to minimize vibration of the electric component portion provided with the connection terminal even when the optical filter device is vibrated due to an impact being applied to the optical filter device or the optical filter device being driven. Therefore, it is possible to prevent a defect such as the connection terminal being disconnected from the casing side terminal.

In the optical filter device of the aspect of the invention, it is preferable that the fixation portion is provided at a single location of the first side surface.

According to this configuration, the fixation portion is provided at a single location on the first side surface. Accordingly, it is possible to reduce stress applied to the substrate from the fixation portion, and thus to more effectively minimize deflection of the substrate.

In the optical filter device of the aspect of the invention, it is preferable that the fixation portion is provided at a plurality of locations of the first side surface.

In this configuration, a plurality of fixation portions are provided. The plurality of fixation portions are provided in this way, and therefore it is possible to increase a fixation force of the substrate to the casing, and thus to more reliably fix the substrate to the casing.

In the optical filter device of the aspect of the invention, it is preferable that the side surface includes a planar first side surface and a second side surface parallel to the first side surface, and the fixation portion is provided on the first side surface and the second side surface.

According to this configuration, the fixation portion is provided on the first side surface and the second side surface which have a planar shape and are parallel to each other. Accordingly, since the substrate is fixed to the casing at each of a pair of side surfaces, it is possible to increase a fixation force of the substrate to the casing, and thus to more reliably fix the substrate to the casing.

In the optical filter device of the aspect of the invention, it is preferable that the fixation portion provided on the first side surface and the fixation portion provided on the second side surface are provided at positions which are symmetrical to each other with respect to a virtual plane which passes through a center of the substrate and is parallel to the first side surface and the second side surface.

In this configuration, the fixation portions are provided at positions which are symmetrical to each other (positions where the first side surface and the second side surface oppose each other) with respect to the virtual plane which passes through the center of the substrate. Therefore, stresses applied to the substrate from the respective fixation portions are balanced, and thus the stresses are canceled out. Accordingly, it is possible to more effectively reduce deflection of the substrate.

In the optical filter device of the aspect of the invention, it is preferable that the side surface includes a planar first side surface and a third side surface along a plane which is continued to the first side surface and intersects the first side surface, and the fixation portion is provided over the first side surface and the third side surface.

In this configuration, the fixation portion is provided over the first side surface and the third side surface which are connected to each other.

Accordingly, the substrate can be fixed to the casing by pressing the substrate against the inner wall or the like of the casing in a state in which a member such as an adhesive for forming the fixation portion is disposed from the first side surface to the third side surface through a corner at which the first side surface intersects the third side surface. Therefore, it is possible to fix the substrate to the casing with a simple operation.

In addition, since the substrate is fixed to the casing on the two intersecting side surfaces, it is possible to increase a fixation force of the substrate to the casing and thus to more reliably fix the substrate to the casing.

In the optical filter device of the aspect of the invention, it is preferable that the casing includes a support portion that supports the interference filter with respect to the casing, and the fixation portion is provided between the side surface and the support portion.

According to this configuration, the casing includes the support portion which supports the optical filter device, and the fixation portion is provided between the side surface and the support portion. Accordingly, it is possible to fix the interference filter to any casing on the side surface of the substrate regardless of a shape of the casing.

Another aspect of the invention is directed to an optical module including an optical filter device; and a detection unit that detects light extracted by the interference filter, in which the optical filter device includes an interference filter that has a first reflective film, a second reflective film facing the first reflective film, and a substrate provided with either of the first reflective film and the second reflective film; a casing that has an inner space for storing the interference filter therein; and a fixation portion that fixes the interference filter to the casing, in which the fixation portion is provided between a side surface of the substrate in a thickness direction of the substrate and the casing.

In this aspect of the invention, in the same manner as in the aspect described above, since the fixation portion is provided on the side surface of the substrate, as described above, it is possible to minimize the occurrence of deflection of the substrate due to a stress from the fixation portion, and thus to prevent deterioration in a performance of the interference filter. Accordingly, it is possible to more reliably provide an optical module having a desired performance.

Still another aspect of the invention is directed to an electronic apparatus including an optical filter device; and a controller that controls the interference filter, in which the optical filter device includes an interference filter that has a first reflective film, a second reflective film facing the first reflective film, and a substrate provided with either of the first reflective film and the second reflective film; a casing that has an inner space for storing the interference filter therein; and a fixation portion that adheres and fixes the interference filter to the casing, in which the fixation portion is provided between a side surface of the substrate in a thickness direction of the substrate and the casing.

In this aspect of the invention, in the same manner as in the aspects described above, since the fixation portion is provided on the side surface of the substrate, as described above, it is possible to minimize the occurrence of deflection of the substrate due to a stress from the fixation portion, and thus to prevent deterioration in a performance of the interference filter. Accordingly, it is possible to more reliably provide an electronic apparatus having a desired performance.

Yet another aspect of the invention is directed to a MEMS device including a MEMS element provided with a substrate; a casing that has an inner space for storing the MEMS element therein; and a fixation portion that fixes the MEMS element to the casing, in which the fixation portion is provided between a side surface of the substrate in a thickness direction of the substrate and the casing.

In this aspect of the invention, in the same manner as in the aspects described above, the substrate of the MEMS element is fixed to the casing by the fixation portion provided on the side surface. Accordingly, as described above, it is possible to minimize deflection of the substrate and thus to prevent deterioration in performance due to distortion occurring in the MEMS element.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

Hereinafter, a first embodiment will be described with reference to the drawings.

Configuration of Optical Filter Device

Figure 1:
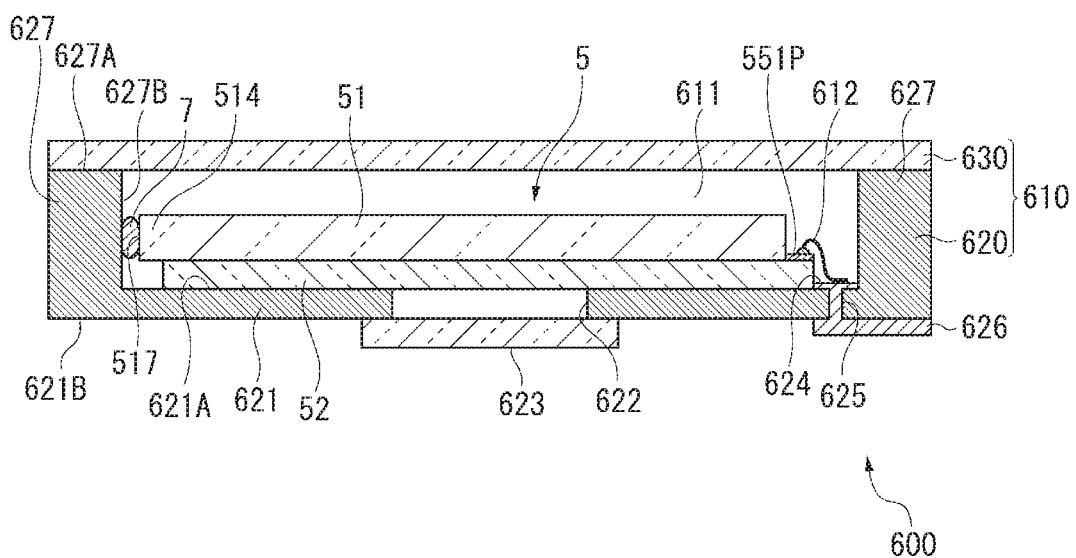
FIG. 1 is a cross-sectional view illustrating a schematic configuration of an optical filter device of a first embodiment.

FIG. 1 is a cross-sectional view illustrating a schematic configuration of an optical filter device 600 which is an embodiment of an optical filter device.

The optical filter device 600 is a device which extracts targeted light with a predetermined wavelength from incident inspection target light and emits the targeted light, and includes a casing 610 and a wavelength variable interference filter 5 stored inside the casing 610. The optical filter device 600 may be incorporated into, for example, an optical module such as a colorimetry sensor, or an electronic apparatus such as a colorimetry apparatus or a gas analysis apparatus. In addition, a configuration of the optical module or the electronic apparatus having the optical filter device 600 will be described later in detail.

Configuration of Wavelength Variable Interference Filter

Figure 2:
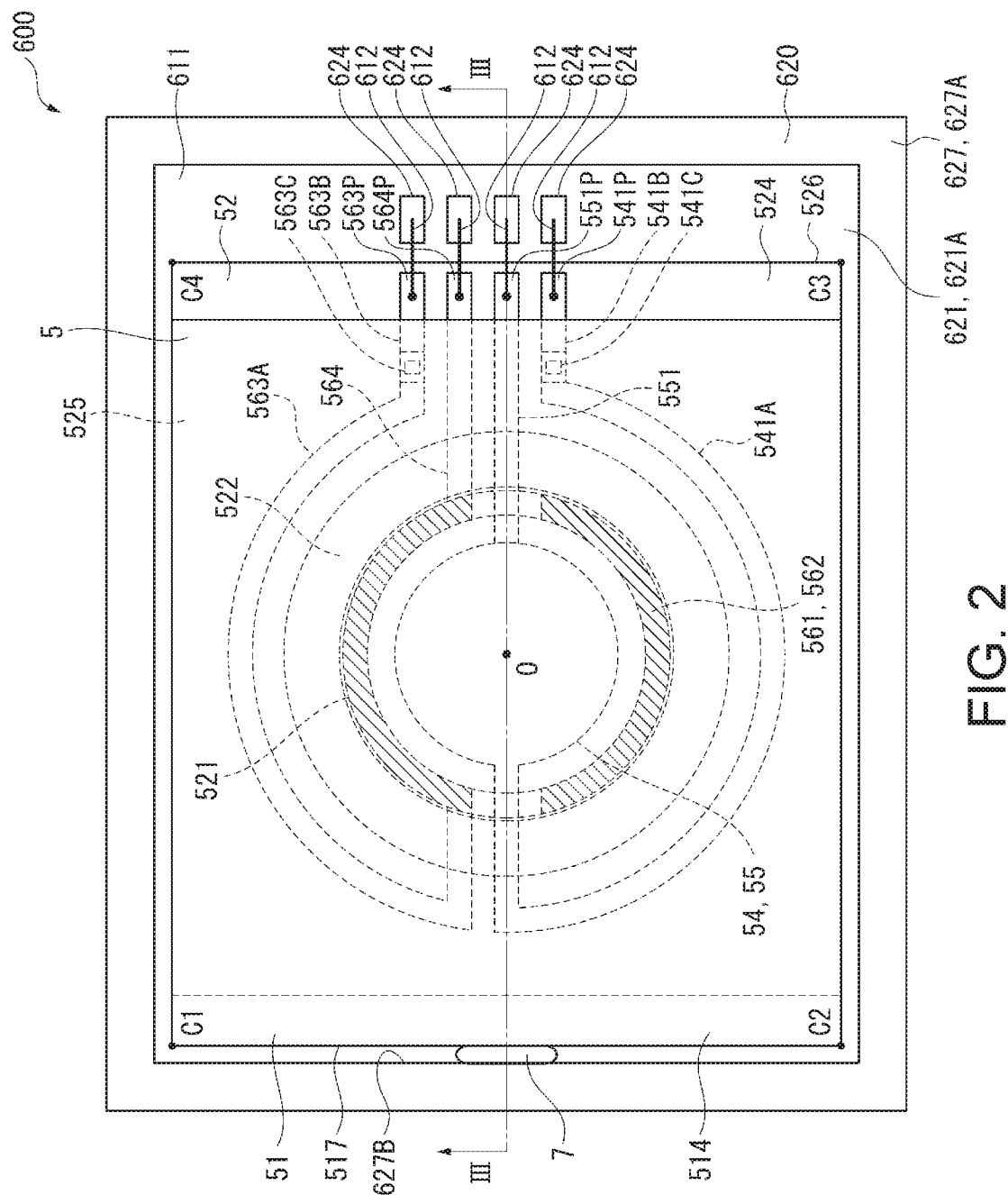
FIG. 2 is a plan view illustrating a schematic configuration of the optical filter device of the embodiment.

A wavelength variable interference filter 5 corresponds to an interference filter. FIG. 2 is a plan view illustrating a schematic configuration of the wavelength variable interference filter 5 stored inside the casing 610, and FIG. 3 is a cross-sectional view illustrating a schematic configuration of the wavelength variable interference filter 5, taken along the line III-III in FIG. 2.

As illustrated in FIG. 2, the wavelength variable interference filter 5 is, for example, a rectangular plate-shaped optical member. The wavelength variable interference filter 5 includes a fixed substrate 51 and a movable substrate 52. In addition, of the respective substrates 51 and 52, the fixed substrate 51 corresponds to a first substrate, and the movable substrate 52 corresponds to a second substrate. Each of the fixed substrate 51 and the movable substrate 52 is made of, for example, a type of glass such as soda glass, crystalline glass, quartz glass, lead glass, potassium glass, borosilicate glass, and alkali-free glass, quartz crystal, or the like. In addition, the fixed substrate 51 and the movable substrate 52 are joined to each other via a joining film 53 (a first joining film 531 and a second joining film 532) and are thus integrally formed as illustrated in FIG. 3. Specifically, a first joining portion 513 of the fixed substrate 51 and a second joining portion 523 of the movable substrate 52 are joined to each other via the joining film 53 which is formed of, for example, a plasma polymerization film or the like having siloxane as a main component.

In addition, in the following description, a plan view in which the wavelength variable interference filter 5 is viewed from the substrate thickness direction of the fixed substrate 51 or the movable substrate 52, that is, a plan view in which the wavelength variable interference filter 5 is viewed from a stacking direction of the fixed substrate 51, the joining film 53, and the movable substrate 52 is referred to as a filter plan view.

Figure 3:
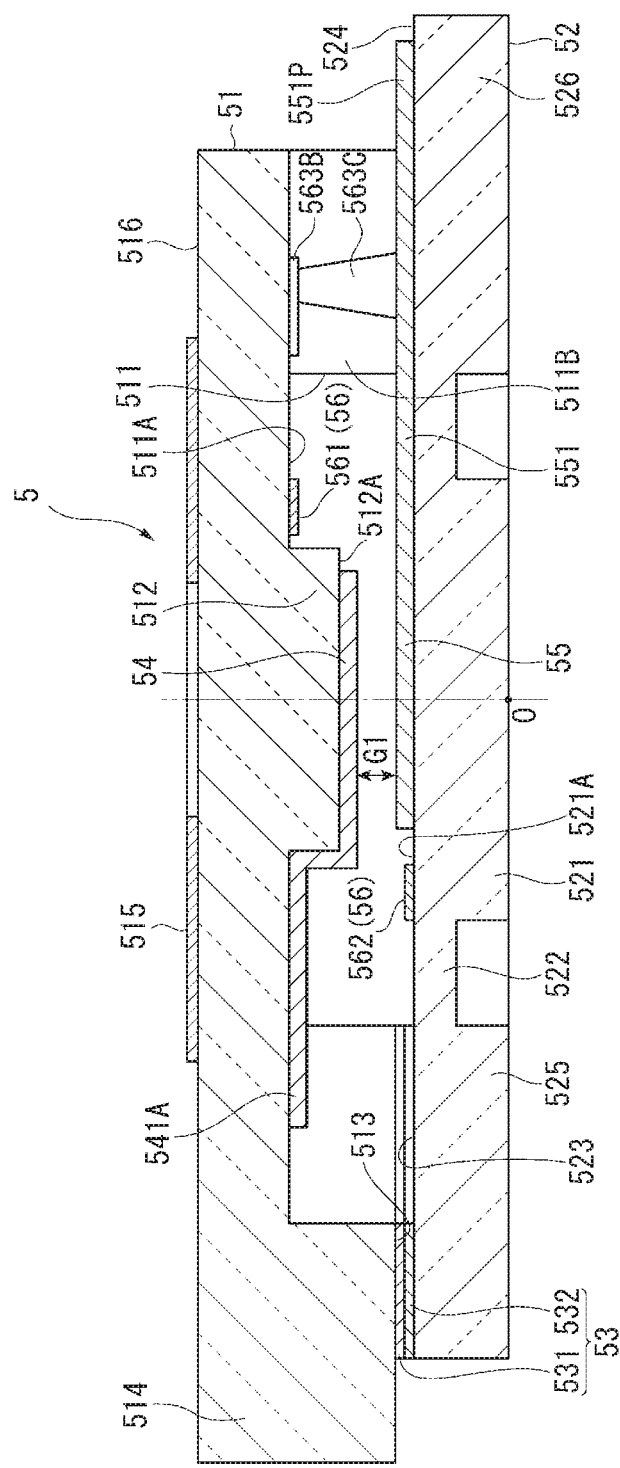
FIG. 3 is a cross-sectional view illustrating a schematic configuration of a wavelength variable interference filter of the embodiment.

As illustrated in FIG. 3, a fixed reflective film 54 corresponding to a first reflective film is provided on the fixed substrate 51. In addition, a movable reflective film 55 corresponding to a second reflective film is provided on the movable substrate 52. The fixed reflective film 54 and the movable reflective film 55 are disposed so as to face each other with a gap G1 between the reflective films.

The wavelength variable interference filter 5 is provided with an electrostatic actuator 56 which is used to adjust a distance (dimension) of the gap G1 between the reflective films. The electrostatic actuator 56 includes a fixed electrode 561 provided on the fixed substrate 51 and a movable electrode 562 provided on the movable substrate 52, and is formed by the electrodes 561 and 562 facing each other (a region indicated by the diagonal lines of FIG. 2). The fixed electrode 561 faces the movable electrode 562 with a gap between the electrodes. Here, the electrodes 561 and 562 may be respectively directly provided on the substrate surfaces of the fixed substrate 51 and the movable substrate 52, and may be provided via other film members.

In addition, in the present embodiment, a configuration is exemplified in which the gap G1 between the reflective films is formed to be smaller than the gap between the electrodes, but the gap G1 between the reflective films may be formed to be larger than the gap between the electrodes, for example, depending on a wavelength band which is desired to be transmitted by the wavelength variable interference filter 5.

In the filter plan view, one side (for example, a side between vertexes C3 and C4 in FIG. 2) of sides of the movable substrate 52 projects further outward than the fixed substrate 51. A projecting part of the movable substrate 52 is an electric component portion 526 which is not joined to the fixed substrate 51. In addition, the electric component portion 526 corresponds to a projecting portion in the movable substrate 52. In the electric component portion 526 of the movable substrate 52, an exposed surface when the wavelength variable interference filter 5 is viewed from the fixed substrate 51 side is an electric component surface 524, and electrode pads 541P, 551P, 563P and 564P (corresponding to connection terminals) described later are provided thereon.

Configuration of Fixed Substrate

The fixed substrate 51 is formed by processing, for example, a glass base material which is formed to have a thickness of 500 μm. Specifically, as illustrated in FIG. 3, the fixed substrate 51 is provided with an electrode arrangement groove 511 and a reflective film installation portion 512 which are formed through etching. The fixed substrate 51 is formed to have a larger thickness dimension than that of the movable substrate 52, and thus there is no deflection of the fixed substrate 51 due to an electrostatic attraction caused by application of a voltage between the fixed electrode 561 and the movable electrode 562 or an internal stress of the fixed electrode 561.

The electrode arrangement groove 511 is formed in a ring shape centering on a plane central point O of the wavelength variable interference filter 5 in the filter plan view. The reflective film installation portion 512 is formed so as to protrude toward the movable substrate 52 side from the central part of the electrode arrangement groove 511 in the filter plan view as illustrated in FIG. 3. A groove bottom surface of the electrode arrangement groove 511 is an electrode installation surface 511A on which a fixed electrode 561 is disposed. In addition, a protruding front end surface of the reflective film installation portion 512 is a reflective film installation surface 512A.

Further, the fixed substrate 51 is provided with an electrode extraction groove 511B which extends from the electrode arrangement groove 511 toward the electric component surface 524.

The fixed electrode 561 is provided around the reflective film installation portion 512 on the electrode installation surface 511A of the electrode arrangement groove 511. The fixed electrode 561 is provided in a region facing the movable electrode 562 of a movable portion 521 described later on the electrode installation surface 511A, and is formed in a substantially C shape having an opening on a side between vertexes C1 and C2 illustrated in FIG. 2. In addition, an insulating film for ensuring insulation between the fixed electrode 561 and the movable electrode 562 may be laminated on the fixed electrode 561.

Further, the fixed substrate 51 is provided with a fixed extraction electrode 563A which extends from an outer circumferential edge around the opening of the C-shaped fixed electrode 561 toward the side between the vertexes C3 and C4 illustrated in FIG. 2. An extending front end (a part located at the side between the vertexes C3 and C4 of the fixed substrate 51) of the fixed extraction electrode 563A is electrically connected to a fixed connection electrode 563B which is provided on the movable substrate 52 side via a bump electrode 563C. The fixed connection electrode 563B extends up to the electric component surface 524 through an electrode extraction groove 511B, and forms the fixed electrode pad 563P corresponding to a connection terminal on the electric component surface 524. The fixed electrode pad 563P is connected to an internal terminal portion 624 which is provided inside the casing 610 and will be described later.

In addition, in the present embodiment, a configuration in which a single fixed electrode 561 is provided on the electrode installation surface 511A is described, but, for example, a configuration (double electrode configuration) or the like in which two electrodes forming concentric circles centering on the plane central point O are provided may be employed.

As described above, the reflective film installation portion 512 is formed in a substantially columnar shape having a smaller diameter dimension than that of the electrode arrangement groove 511 on the same axis as the electrode arrangement groove 511, and the reflective film installation portion 512 is provided with the reflective film installation surface 512A facing the movable substrate 52.

The reflective film installation portion 512 is provided with the fixed reflective film 54 as illustrated in FIG. 3. As the fixed reflective film 54, for example, a metal film such as Ag, or an alloy film such as an Ag alloy may be used. In addition, for example, a dielectric multilayer film which has a high refractive index layer made of $TiO_2$ and a low refractive index layer made of $SiO_2$ may be used. Further, a reflective film in which a metal film (or an alloy film) is laminated on a dielectric multilayer film, a reflective film in which a dielectric multilayer film is laminated on a metal film (or an alloy film), a reflective film in which a single refractive layer ($TiO_2$ or $SiO_2$) and a metal film (or an alloy film) are laminated, or the like may be used.

Further, the fixed substrate 51 is provided with a fixed mirror electrode 541A which is connected to the fixed reflective film 54, extends toward the side between the vertexes C1 and C2 through the opening of the C-shape fixed electrode 561, and then extends toward the side between the vertexes C3 and C4. For example, in a case where the fixed reflective film 54 is formed of a metal film such as an Ag alloy, the fixed mirror electrode 541A can be formed along with the fixed reflective film 54.

A extending front end (a part located at the side between the vertexes C3 and C4 of the fixed substrate 51) of the fixed mirror electrode 541A is electrically connected to a fixed mirror connection electrode 541B provided on the movable substrate 52 side via a bump electrode 541C. The fixed mirror connection electrode 541B extends up to the electric component surface 524 through the electrode extraction groove 511B, and forms the fixed mirror electrode pad 541P corresponding to a connection terminal on the electric component surface 524. In addition, the fixed mirror electrode pad 541P is connected to an internal terminal portion 624 which is provided at a pedestal portion 621 and will be described later, and is also connected to a ground circuit (not illustrated). Accordingly, the fixed reflective film 54 is set to a ground potential (0 V).

Further, as illustrated in FIG. 3, a surface of the fixed substrate 51 on which the fixed reflective film 54 is not provided is a light incidence surface 516. Further, an anti-reflective film may be formed at a position corresponding to the fixed reflective film 54 on the light incidence surface 516. This antireflective film may be formed by alternately laminating a low refractive index film and a high refractive index film, and increases transmittance by reducing reflectance of visible light on the surface of the fixed substrate 51.

Further, as illustrated in FIG. 3, a non-transmissive member 515 which is made of, for example, Cr, is provided on the light incidence surface 516 of the fixed substrate 51 (in FIG. 2, the non-transmissive member 515 is not illustrated). The non-transmissive member 515 is formed in a ring shape, and is preferably formed in a circular ring shape. In addition, an inner ring diameter of the non-transmissive member 515 is set to an effective diameter for optical interference using the fixed reflective film 54 and the movable reflective film 55. Accordingly, the non-transmissive member 515 functions as an aperture which restricts incident light which is incident to the optical filter device 600.

In addition, a part, in which the electrode arrangement groove 511, the reflective film installation portion 512, and the electrode extraction groove 511B are not formed through etching on the surface of the fixed substrate 51 facing the movable substrate 52, forms the first joining portion 513. The first joining film 531 is provided at the first joining portion 513, and the first joining film 531 is joined to the second joining film 532 provided on the movable substrate 52 so that the fixed substrate 51 and the movable substrate 52 are joined together as described above. The joined fixed substrate 51, as illustrated in FIG. 3, has a projecting portion 514 so that one side (for example, the side between the vertexes C1 and C2 in FIG. 2) of the sides of the fixed substrate 51 projects further outward than the movable substrate 52 in the filter plan view. The projecting portion 514 is a part which does not overlap the movable substrate 52 in the filter plan view.

Configuration of Movable Substrate

The movable substrate 52 is formed by processing, for example, a glass base material which is formed to have a thickness of 200 μm.

Specifically, in the filter plan view as illustrated in FIG. 2, the movable substrate 52 includes the movable portion 521 which has a circular shape centering on the plane central point O, a holding portion 522 which is provided outside the movable portion 521 and holds the movable portion 521, and a substrate outer circumferential portion 525 which is provided outside the holding portion 522.

The movable portion 521 is formed to have a larger thickness dimension than that of the holding portion 522, and, for example, in the present embodiment, is formed in the same dimension as a thickness dimension of the movable substrate 52. The movable portion 521 is formed to have a larger diameter dimension than at least a diameter dimension of the outer circumferential edge of the reflective film installation surface 512A in the filter plan view. In addition, the movable electrode 562 and the movable reflective film 55 are provided at the movable portion 521.

In the same manner as in the fixed substrate 51, an antireflective film may be formed on a surface of the movable portion 521 on an opposite side to the fixed substrate 51. This antireflective film may be formed by alternately laminating a low refractive index film and a high refractive index film, and increases transmittance by reducing reflectance of visible light on the surface of the movable substrate 52. In addition, in the present embodiment, a surface of the movable portion 521 facing the fixed substrate 51 is a movable surface 521A.

The movable electrode 562 faces the fixed electrode 561 with the gap between the electrodes, and is formed in a substantially C shape which has an opening on the side between the vertexes C3 and C4 illustrated in FIG. 2 at a position facing the fixed electrode 561. In addition, the movable substrate 52 is provided with a movable extraction electrode 564 which extends from the outer circumferential edge of the opening of the C-shaped movable electrode 562 toward the electric component surface 524. An extending front end of the movable extraction electrode 564 forms the movable electrode pad 564P corresponding to a connection terminal on the electric component surface 524. The movable electrode pad 564P is connected to the internal terminal portion 624 which is provided at the pedestal portion 621 and will be described later.

As illustrated in FIG. 3, the movable reflective film 55 is provided so as to face the fixed reflective film 54 with the gap G1 between the reflective films at the center of the movable surface 521A of the movable portion 521. A reflective film having the same configuration as the above-described fixed reflective film 54 is used as the movable reflective film 55.

In the same manner as in the fixed mirror electrode 541A, the movable substrate 52 is provided with a movable mirror electrode 551 which is connected to the movable reflective film 55 and extends toward the electric component surface 524 through the opening of the C-shaped of the movable electrode 562. An extending front end of the movable mirror electrode 551 forms the movable mirror electrode pad 551P corresponding to a connection terminal on the electric component surface 524. In addition, the movable mirror electrode pad 551P is connected to the internal terminal portion 624 which is provided at the pedestal portion 621 and will be described later, and is connected to a ground circuit (not illustrated) in the same manner as the fixed mirror electrode pad 541P. Accordingly, the movable reflective film 55 is set to a ground potential (0 V).

The holding portion 522 is a diaphragm which surrounds the periphery of the movable portion 521, and is formed to have a smaller thickness dimension than that of the movable portion 521.

The holding portion 522 is more easily deflected than the movable portion 521, and can displace the movable portion 521 to the fixed substrate 51 side with a slight electrostatic attraction. At this time, the movable portion 521 has a larger thickness dimension than that of the holding portion 522, and has an increasing rigidity. For this reason, the shape of the movable portion 521 is not changed even in a case where the holding portion 522 is pulled to the fixed substrate 51 side by an electrostatic attraction. Therefore, there is no occurrence of deflection of the movable reflective film 55 provided at the movable portion 521, and it is possible to maintain the fixed reflective film 54 and the movable reflective film 55 in a parallel state at all times.

In addition, in the present embodiment, the holding portion 522 with a diaphragm shape is exemplified, but, the invention is not limited thereto and, for example, the holding portion may have a beam shape so as to be disposed at the same angle intervals centering on the plane central point O.

The substrate outer circumferential portion 525 is provided outside the holding portion 522 in the filter plan view as described above. A surface of the substrate outer circumferential portion 525 facing the fixed substrate 51 is provided with the second joining portion 523 facing the first joining portion 513. In addition, the second joining film 532 is provided at the second joining portion 523, and, as described above, the second joining film 532 is joined to the first joining film 531 so that the fixed substrate 51 and the movable substrate 52 are joined to each other.

Configuration of Casing

The casing 610 includes a base 620 and a lid 630 as illustrated in FIG. 1, and stores the wavelength variable interference filter 5 therein.

The base 620 is provided with a pedestal portion 621 and a sidewall portion 627.

The pedestal portion 621 is a plate-shaped portion having a rectangular periphery in the filter plan view. The wavelength variable interference filter 5 is placed on a base inner surface 621A of the pedestal portion 621 facing the lid 630. The pedestal portion 621 has an opened light exit hole 622 which penetrates therethrough in the thickness direction at the center thereof. An exit side glass window 623 is joined over the light exit hole 622.

In addition, the internal terminal portions 624 (corresponding to casing side terminals) which are connected to the electrode pads 541P, 551P, 563P and 564P of the wavelength variable interference filter 5 are provided on the base inner surface 621A. The internal terminal portions 624 and the electrode pads 541P, 551P, 563P and 564P are connected to each other via wires 612 such as Au, for example, by wire bonding. In addition, in the present embodiment, the wire bonding is exemplified, but, for example, a flexible printed circuit (FPC) or the like may be used.

The pedestal portion 621 is provided with through-holes 625 which are formed at the positions where the internal terminal portions 624 are provided. The internal terminal portions 624 are connected to external terminal portions 626 which are provided on a base outer surface 621B (a surface on an opposite side to the base inner surface 621A) of the pedestal portion 621, via the through-holes 625.

The sidewall portion 627 rises from the edge of the rectangular pedestal portion 621 and covers the periphery of the wavelength variable interference filter 5 placed on the base inner surface 621A. A surface (hereinafter, also referred to as an end surface 627A) of the sidewall portion 627 facing the lid 630 is formed as a planarized surface which is parallel to the base inner surface 621A.

The lid 630 has a rectangular periphery in the same manner as the pedestal portion 621 in the filter plan view, and is made of glass through which light can be transmitted. The lid 630 is joined to the end surface 627A in a state in which the wavelength variable interference filter 5 is disposed on the base inner surface 621A. A space surrounded by an inner surface 627B of the sidewall portion 627, the base inner surface 621A, and the lid 630 is an inner space 611 of the casing 610, and is sealed when the lid 630 is joined.

In the optical filter device 600 configured in this way, light which is incident from the lid 630 side is incident to the wavelength variable interference filter 5. In addition, light spectrally diffracted by the wavelength variable interference filter 5 exits from the light exit hole 622.

Configuration of Fixation Portion

The wavelength variable interference filter 5 is fixed to the casing 610 by a fixation portion 7 as illustrated in FIGS.

1 and 2. Specifically, the fixation portion 7 is formed by using, for example, an epoxy based or silicone based adhesive. The fixation portion 7 is provided on a side surface 517 (corresponding to a first side surface) of the fixed substrate 51 which is connected to the side between the vertexes C1 and C2 on an opposite side to the location where the electrode pads 541P, 551P, 563P and 564P are formed in the wavelength variable interference filter 5. Particularly, in the illustrated example, the fixation portion 7 is provided at a single location of a central part of the side surface 517 in a direction along the side between the vertexes C1 and C2. In addition, the fixation portion 7 is provided at the projecting portion 514 of the fixed substrate 51. The fixation portion 7 configured in this way joins the side surface 517 to the inner surface 627B of the sidewall portion 627 of the casing 610 facing the side surface 517.

Manufacturing of Optical Filter Device

First, an adhesive for forming the fixation portion 7 is coated on the side surface 517 of the wavelength variable interference filter 5 which is created in advance. In addition, the side surface 517 is pressed against the inner surface 627B of the sidewall portion 627 while bringing the movable substrate 52 into contact with the base inner surface 621A. Further, the side surface 517 is joined to the inner surface 627B by the fixation portion 7 which is formed by the cured adhesive. As mentioned above, the wavelength variable interference filter 5 is fixed to the base 620 by the fixation portion 7.

Next, the electrode pads 541P, 551P, 563P and 564P of the wavelength variable interference filter 5 are connected to the internal terminal portions 624 of the base 620 via the wires 612 by wire bonding. Specifically, wires are inserted into a capillary, and balls (free air balls: FAB) are formed at front ends of the wires 612. The capillary is moved in this state so as to bring the balls into contact with the fixed electrode pad 563P, thereby allowing a bond to be formed. In addition, the capillary is moved so that the wires are also connected to the internal terminal portions 624, and then the wires are cut. The same connection step is also performed on the other electrode pads 541P, 551P and 564P.

Although a description has been made of an example in which the connection is performed by using ball bonding as the wire bonding, wedge bonding or the like may be used. In addition, connection is not limited to using the wire bonding, and, an FPC may be used, and joining may be performed by using Ag paste, an anisotropic conductive film (ACF), an anisotropic conductive paste (ACP) or the like.

Then, the base 620 is joined to the lid 630. The joining between the base 620 and the lid 630 is performed, for example, by using a low melting glass under an environment which is set to a vacuum atmosphere by a vacuum chamber device.

Due to the above-described steps, the optical filter device 600 is manufactured.

Operations and Effects of First Embodiment

In the present embodiment, the wavelength variable interference filter 5 is fixed to the casing 610 by the fixation portion 7 which is provided on the side surface 517 of the fixed substrate 51. In this configuration, it is possible to minimize the occurrence of deflection of the fixed substrate 51 as compared with in a case where the fixation portion 7 is provided on the lower surface of the substrate (for example, the movable substrate 52) and the wavelength variable interference filter 5 is fixed to the casing, and thus to prevent a reduction in spectral accuracy of the wavelength variable interference filter 5.

Hereinafter, a description will be made of a principle in which the occurrence of deflection of the fixed substrate 51 is minimized by the optical filter device 600 of the present embodiment.

Figure 4:
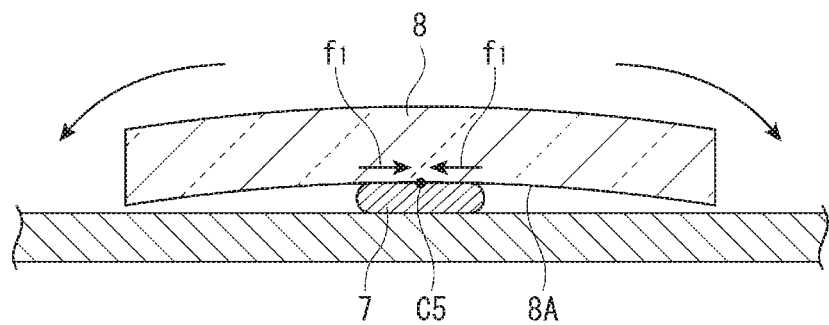
FIG. 4 is a cross-sectional view schematically illustrating a fixation state of a substrate in a comparative example.
Figure 5:
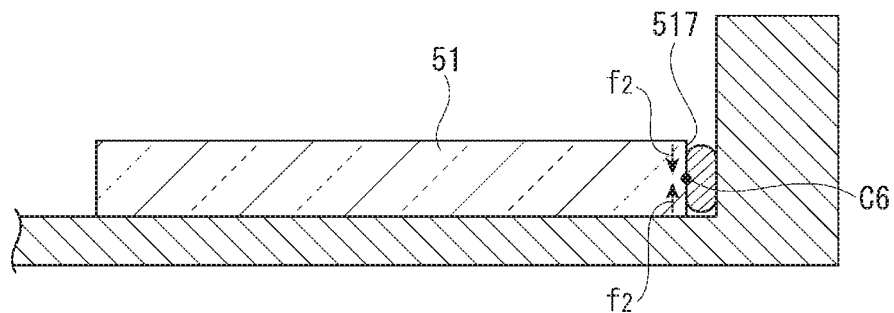
FIG. 5 is a cross-sectional view schematically illustrating a fixation state of a fixed substrate of the embodiment.

FIG. 4 is a cross-sectional view schematically illustrating a state in which a lower surface of a substrate is fixed to a casing by a fixation portion as a comparative example. In addition, FIG. 5 is a cross-sectional view schematically illustrating a configuration of the present embodiment. Further, in FIG. 5, only the fixed substrate 51 of the wavelength variable interference filter 5 is illustrated, and other members such as the movable substrate 52 are not illustrated.

In a case where the fixation portion 7 is provided on a lower surface 8A of a substrate 8 as in the comparative example illustrated in FIG. 4, the substrate 8 receives stresses f1 directed to a position C5 centering on the position C5 where the fixation portion 7 is provided. As a result, the substrate 8 is deflected in a substrate thickness direction centering on the position C5.

In contrast, as illustrated in FIG. 5, in a case where the fixation portion 7 is provided on the side surface 517 of the fixed substrate 51, the fixed substrate 51 receives stresses f2 directed to a position C6 where the fixation portion 7 is provided from the fixation portion 7 in a direction along the side surface 517. The stresses are forces which cause deflection of the fixed substrate 51 in a direction perpendicular to the side surface 517 centering on the position C6. Here, the fixed substrate 51 is a plate-shaped member, in which a dimension in the plane direction is much larger than a thickness dimension, and rigidity in the plane direction is larger than rigidity in the thickness direction. Therefore, the fixation portion 7 is provided on the side surface 517, and thus it is possible to minimize deflection of the fixed substrate 51.

As mentioned above, since deflection of the fixed substrate 51 is minimized, deflection of the movable substrate 52 joined to the fixed substrate 51 can be also minimized, and thus deterioration in an optical characteristic of the wavelength variable interference filter 5, that is, spectral accuracy can be prevented.

In addition, FIGS. 4 and 5 exemplify a case where the fixed substrate 51 receives a compression stress caused by curing of an adhesive forming the fixation portion 7, but this is also the same for a case where the fixed substrate 51 receives a stress caused by a difference between linear expansion coefficients of the fixed substrate 51 and the fixation portion 7. In addition, the stress caused by a difference between linear expansion coefficients may occur as a decompression stress in an opposite direction to the stress for compressing the fixed substrate 51. For example, an expansion coefficient of the fixation portion 7 is larger than that of the fixed substrate 51. The decompression stress is a stress which causes the substrate to be deflected in an opposite direction to the compression stress.

In addition, in the present embodiment, the wavelength variable interference filter 5 includes the fixed substrate 51 and the movable substrate 52. The fixed substrate 51 and the movable substrate 52 are disposed so as to face each other, and are joined together via the joining film 53. In this configuration, if the fixation portion 7 is provided on both side surfaces of the fixed substrate 51 and the movable substrate 52, there is a concern that parallelism between the fixed substrate 51 and the movable substrate 52 or a gap dimension between the reflective films 54 and 55 may be changed by a stress of the fixation portion 7.

In contrast, in the present embodiment, the fixation portion 7 is provided on the side surface 517 of the fixed substrate 51, and thus a stress for displacing the fixed substrate 51 and the movable substrate 52 in contact and separation directions is not applied from the fixation portion as described above. Therefore, there is not the above-described problem, and deterioration in spectral accuracy of the wavelength variable interference filter 5 does not occur.

In the wavelength variable interference filter 5 of the present embodiment, the fixation portion 7 is provided at the projecting portion 514 of the fixed substrate 51 which does not overlap the movable substrate 52 in the filter plan view. In this configuration, the side surface 517 of the fixed substrate 51 provided with the fixation portion 7 can be separated from the movable substrate 52. For this reason, an adhesive can be prevented from being spread from the side surface 517 of the fixed substrate 51 to the side surface of the movable substrate 52, and thus it is possible to prevent simultaneous fixation of the fixed substrate 51 and the movable substrate 52 from being performed by the fixation portion 7. Therefore, as described above, it is possible to more reliably maintain parallelism between the substrates 51 and 52.

The wavelength variable interference filter 5 of the present embodiment has a configuration in which the movable portion 521 and the holding portion 522 are provided on the movable substrate 52 so as to change a dimension of the gap between the reflective films. In the wavelength variable interference filter 5, rigidity of the fixed substrate 51 is larger than rigidity of the movable substrate 52 and has high resistance to a stress. Therefore, the fixation portion 7 is provided on the fixed substrate 51, and therefore it is possible to more reliably minimize the occurrence of deflection and thus to prevent deterioration in spectral accuracy.

In the present embodiment, each of the substrates 51 and 52 has a rectangular periphery in the filter plan view, and the fixation portion 7 is provided on the side surface 517 corresponding to the side between the vertexes C1 and C2. Accordingly, the fixed substrate 51 is made to close to or to be pressed against the inner surface of the casing 610 in a state in which an adhesive is coated on the side surface 517, and thus the fixed substrate 51 can be fixed to the casing 610. Therefore, it is possible to fix the wavelength variable interference filter 5 to the casing 610 with a simple operation.

Since the fixed substrate 51 is fixed to the casing at a single location, a stress applied to the fixed substrate 51 is smaller than, for example, in a case where the fixation portion 7 is provided at a plurality of locations, and it is possible to further minimize deflection of the fixed substrate 51.

In addition, since the side surface 517 is planar, the fixed substrate 51 is pressed against the planar inner surface of the casing 610 after an adhesive is coated on the side surface 517, and thus it is possible to easily align the fixed substrate 51 with the casing 610. Also in a case where a protrusion or the like for alignment is provided on the inner surface of the casing 610, the side surface 517 of the fixed substrate 51 is planar, and thus it is possible to easily determine a dimension of the protrusion or the like. From the above description, it becomes easier to align the fixed substrate 51, and thus it is possible to fix the fixed substrate 51 to the casing 610 while easily performing the alignment. Therefore, it is possible to easily design the optical filter device 600 and to improve assembly efficiency.

Second Embodiment

Next, a second embodiment will be described with reference to the drawings.

In the present embodiment, the fixation portion 7 is provided on the side surface of the movable substrate 52 on the side (the side between the vertexes C3 and C4) where the electric component portion 526 is formed in the wavelength variable interference filter 5.

Figure 6:
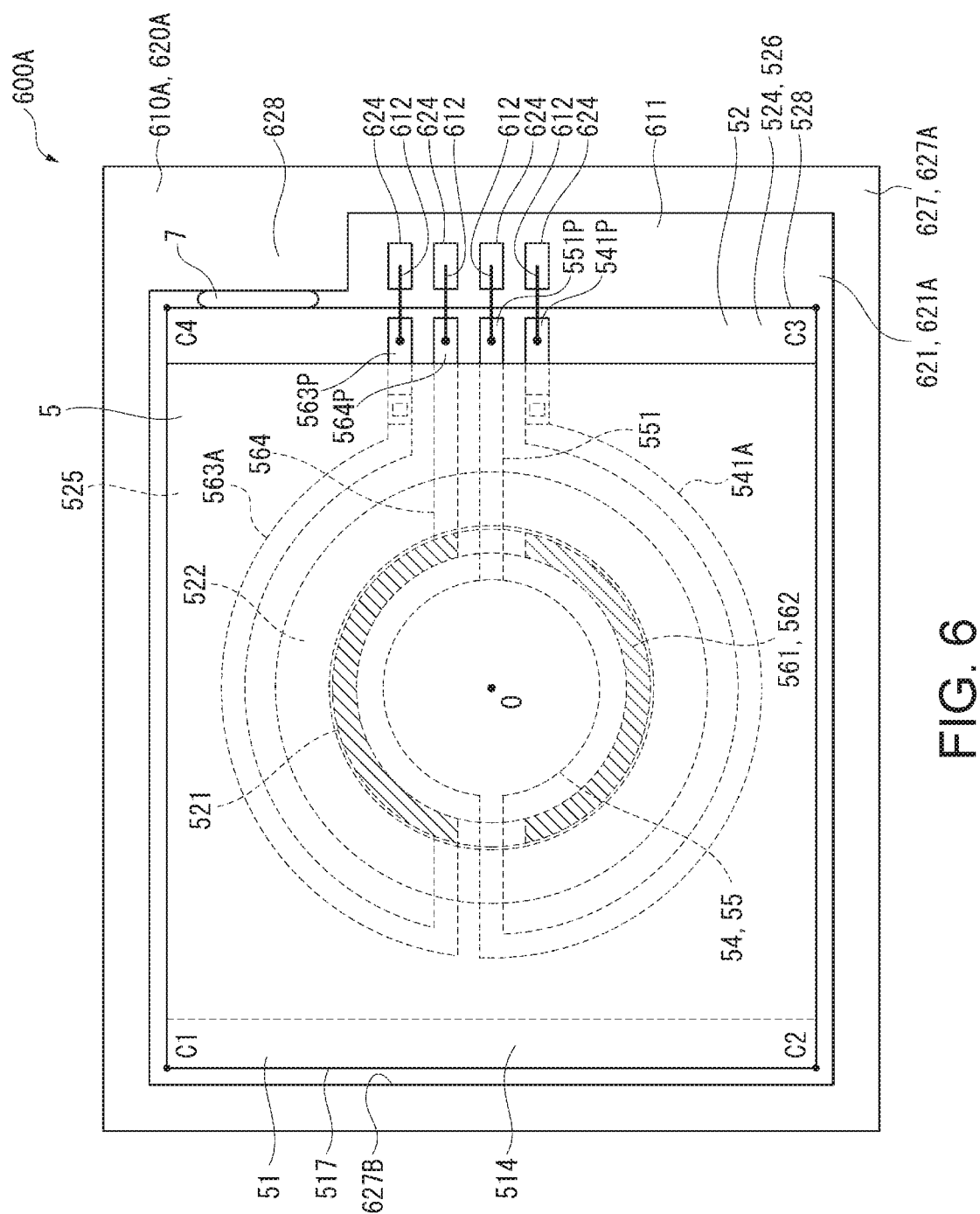
FIG. 6 is a plan view illustrating a schematic configuration of an optical filter device of a second embodiment.

FIG. 6 is a plan view illustrating a schematic configuration of an optical filter device 600A of the second embodiment. In FIG. 6, the lid 630 is not illustrated. In addition, in the following description, constituent elements which have already been described are given the same reference numerals, and description thereof will not be repeated or will be made briefly.

In the present embodiment, as illustrated in FIG. 6, a base 620A of a casing 610A is provided with a casing side projection 628 for fixing the wavelength variable interference filter 5. The casing side projection 628 is integrally formed with the sidewall portion 627 (a corner on the vertex C4 side of the wavelength variable interference filter 5 in FIG. 6) on the side where the internal terminal portions 624 is provided. In addition, the casing side projection 628 has a planarized surface facing the side between the vertexes C3 and C4 of the electric component portion 526 of the wavelength variable interference filter 5, and the planarized surface is parallel to the arrangement direction of the internal terminal portions 624.

As illustrated in FIG. 6, the fixation portion 7 is provided between a side surface 528 of the movable substrate 52 connected to the side between the vertexes C3 and C4 of the electric component portion 526 and the casing side projection 628, and fixes the wavelength variable interference filter 5 to the casing side projection 628. In other words, in the present embodiment, the side surface 528 corresponding to the side between the vertexes C3 and C4 of the movable substrate 52 corresponds to a first side surface.

Operations and Effects of Second Embodiment

In the present embodiment, the fixation portion 7 fixes the side surface 528 corresponding to the side between the vertexes C3 and C4 of the electric component portion 526 where the electrode pads 541P, 551P, 563P and 564P are provided, to the casing 610A.

For this reason, it is possible to minimize vibration of the electric component portion 526 when an impact is applied to the wavelength variable interference filter 5 or when the electrostatic actuator 56 is driven. Therefore, it is possible to prevent a defect such as the wires 612 connected to the electrode pads 541P, 551P, 563P and 564P on the electric component portion 526 being disconnected due to the vibration.

Third Embodiment

Next, a third embodiment will be described with reference to the drawings.

In the second embodiment, a description has been made of an example in which the casing side projection 628 is provided only at the corner corresponding to the vertex C4 of the wavelength variable interference filter. In contrast, the present embodiment is different from the second embodiment in that two casing side projections are provided at a base 620B of a casing 610B, and the fixation portions 7 are respectively provided at positions corresponding to the casing side projections.

Figure 7:
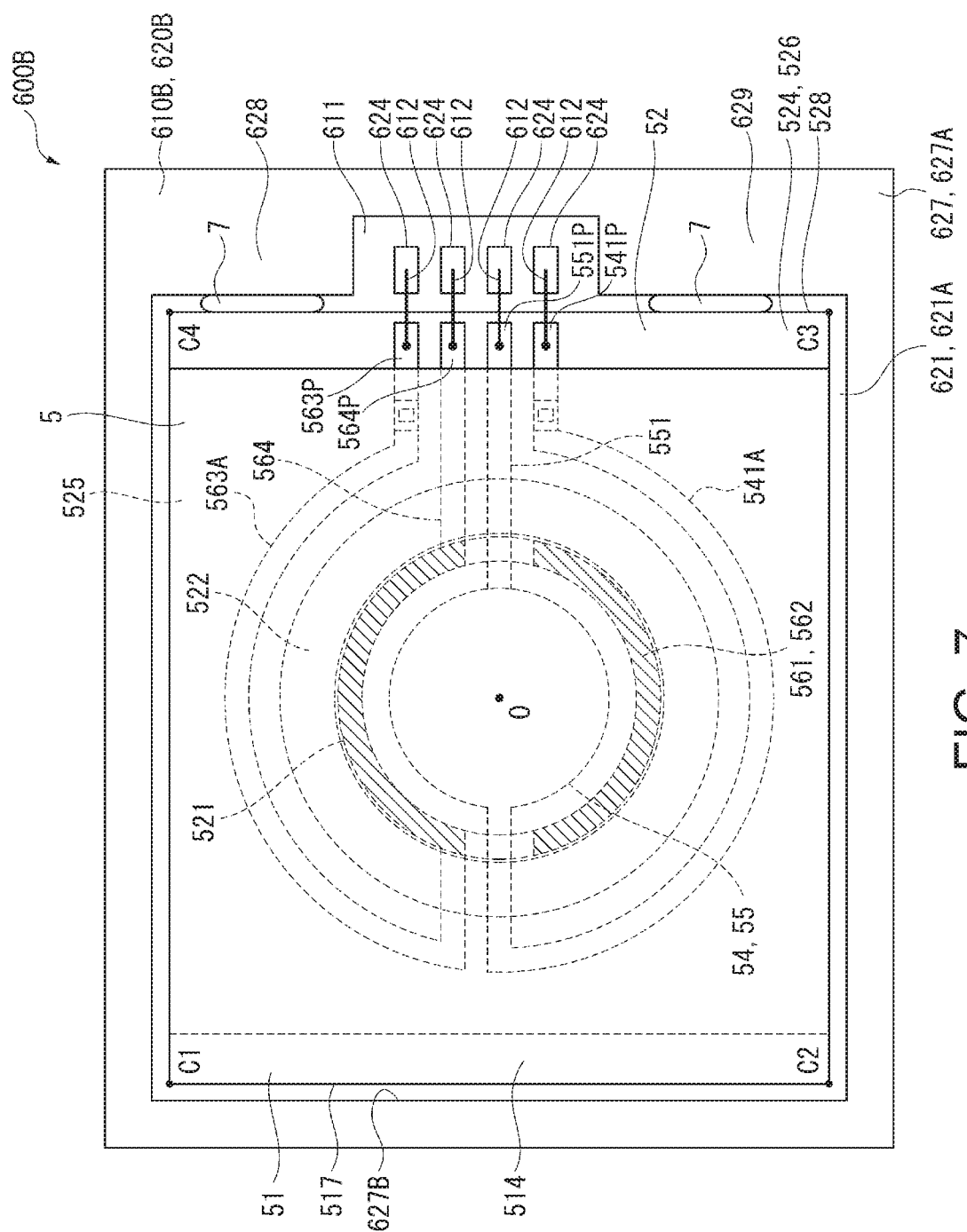
FIG. 7 is a plan view illustrating a schematic configuration of an optical filter device of a third embodiment.

FIG. 7 is a plan view illustrating a schematic configuration of an optical filter device 600B of the third embodiment. In addition, in FIG. 7, the lid 630 is not illustrated.

In the present embodiment, as illustrated in FIG. 7, the base 620B is provided with two casing side projections 628 and 629.

The casing side projection 629 is formed in the same manner as the casing side projection 628, is provided at a corner of the base 620B corresponding to the vertex C3 of the wavelength variable interference filter 5, and projects toward an inner space 611 in a direction which is spaced apart from the sidewall portion 627. In addition, the casing side projection 629 has a planarized surface facing the side between the vertexes C3 and C4 of the wavelength variable interference filter 5, and the planarized surface is parallel to the arrangement direction of the internal terminal portions 624.

The fixation portions 7 are respectively provided between the side surface 528 of the movable substrate 52 continued to the side between the vertexes C3 and C4 and the casing side projections 628 and 629, and the wavelength variable interference filter 5 is fixed to the base 620B by the two fixation portions 7.

Operation and Effects of Third Embodiment

In the present embodiment, a plurality of fixation portions 7 are provided on the side surface 528. Accordingly, it is possible to increase a fixation force to the casing 610B and thus to more reliably fix the substrate to the casing 610B.

Here, in a case where the plurality of fixation portions 7 are provided, the substrate receives stresses from the fixation portions 7, respectively, but, as described above, it is possible to sufficiently minimize influences of the stresses by providing the fixation portions 7 on the side surface 528. Accordingly, in the present embodiment, it is possible to improve a fixation force while minimizing defection of the substrate.

In addition, in the present embodiment, the plurality of fixation portions 7 are provided on a single side surface 528. For this reason, it is possible to easily fix the wavelength variable interference filter 5 to the casing by providing the fixation portions 7 such as adhesives on at least either of the casing side projections 628 and 629 of the casing 610B and the side surface 528 and then by pressing the wavelength variable interference filter 5 against the casing side projections 628 and 629.

In the present embodiment, the movable substrate 52 is fixed to the casing 610B at two locations on the side surface 528 with the electrode pads 541P, 551P, 563P and 564P interposed therebetween in the filter plan view. Accordingly, it is possible to more effectively minimize the above-described vibration of the electric component portion 526 side of the movable substrate 52, and thus to more effectively prevent a defect such as disconnection of the wires 612.

Fourth Embodiment

Next, a fourth embodiment will be described with reference to the drawings.

In the second and third embodiments, a description has been made of an example in which the fixation portion 7 is provided on the side surface 528 corresponding to the side between the vertexes C3 and C4 of the electric component portion 526. In contrast, the present embodiment is different from the above-described embodiments in that the fixation portion 7 is provided at a part of the side between the vertexes C1 and C4 corresponding to the electric component portion 526.

Figure 8:
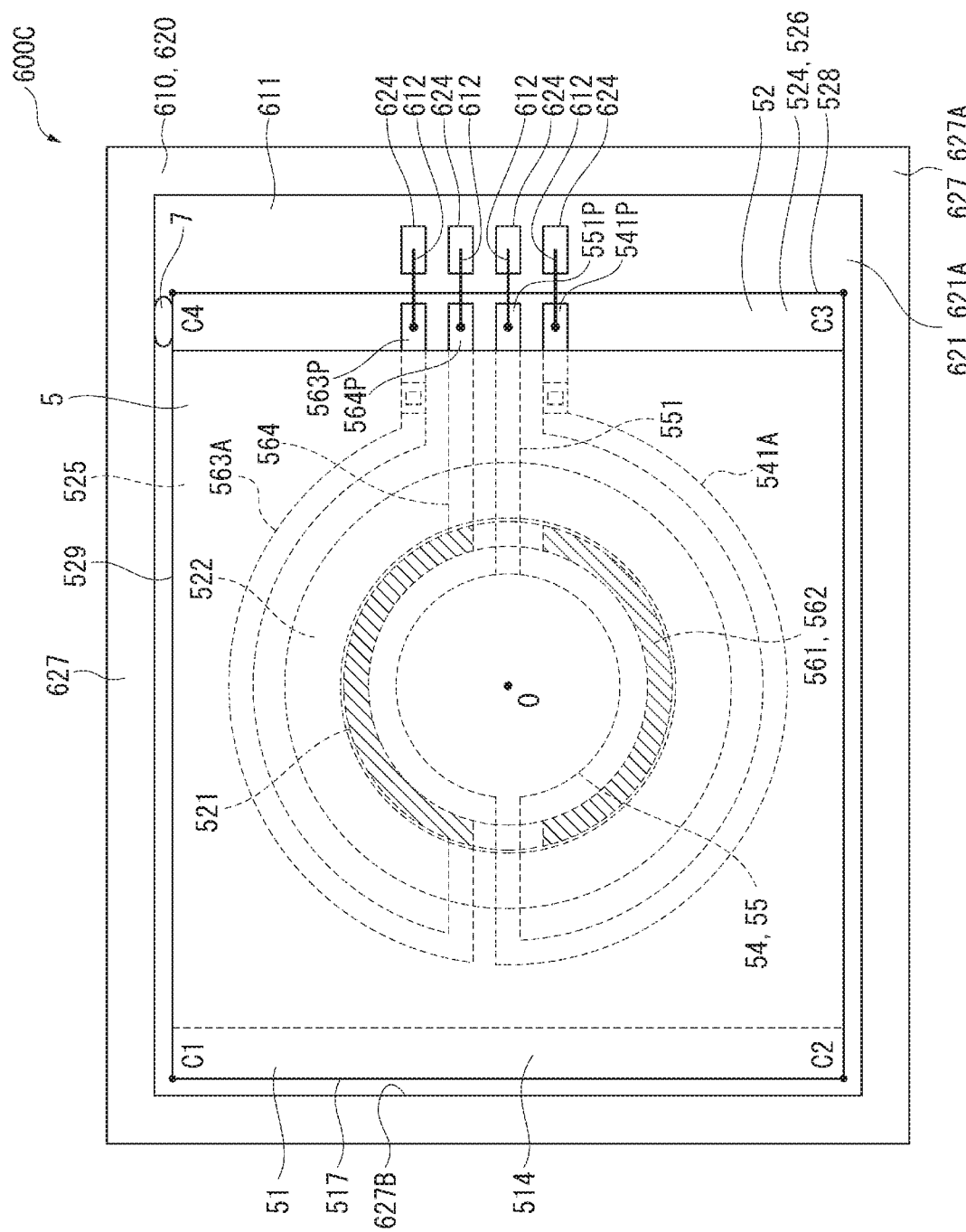
FIG. 8 is a plan view illustrating a schematic configuration of an optical filter device of a fourth embodiment.

FIG. 8 is a plan view illustrating a schematic configuration of an optical filter device 600C of the fourth embodiment.

As illustrated in FIG. 8, the fixation portion 7 is provided on a side surface 529 (a side surface connected to the side between the vertexes C1 and C4) of the electric component portion 526 intersecting the side surface 528 corresponding to the side between the vertexes C3 and C4. In addition, the fixation portion 7 joins the side surface 529 to the inner surface 627B of the sidewall portion 627 facing the side surface 529. In other words, in the present embodiment, the side surface 529 of the movable substrate 52 corresponding to the side between the vertexes C1 and C4 corresponds to a first side surface.

Operations and Effects of Fourth Embodiment

In the present embodiment, the fixation portion 7 is provided at a single location of the side surface 529 of the movable substrate 52. Accordingly, in the same manner as in the first embodiment, it is possible to perform fixation to the casing 610, and thus to minimize deflection of the respective substrates 51 and 52 with a simple operation.

In the present embodiment, the fixation portion 7 is provided near the vertex C4 of the side between the vertexes C3 and C4 of the electric component portion 526 on the side surface 529. Accordingly, in the same manner as in the second embodiment, it is possible to minimize the above-described vibration of the side surface 528 side of the movable substrate 52 and thus to prevent the wires 612 from deviating.

Fifth Embodiment

Next, a fifth embodiment will be described with reference to the drawings.

The present embodiment is different from the fourth embodiment in that a pair of fixation portions 7 is provided at opposing positions.

Figure 9:
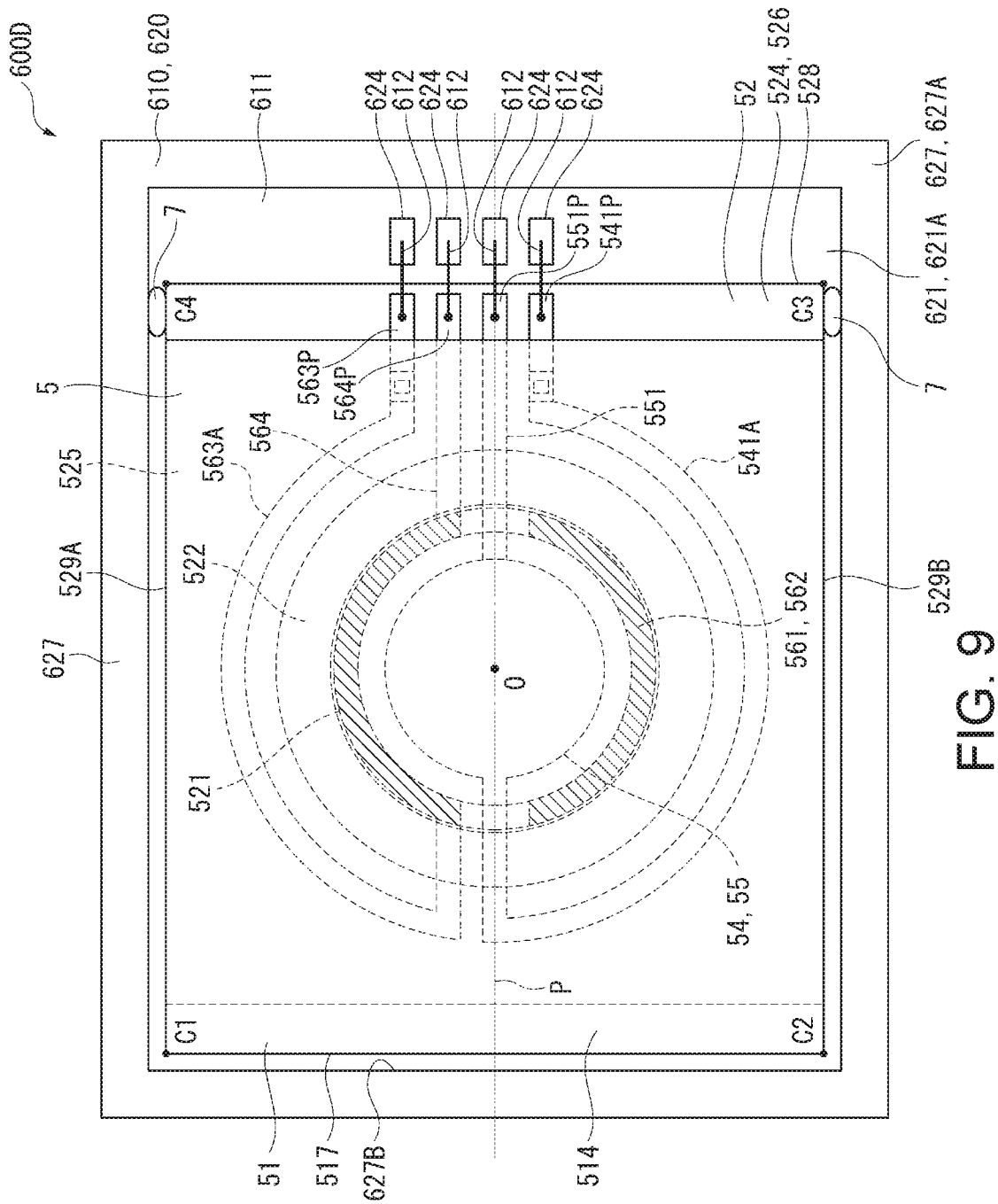
FIG. 9 is a plan view illustrating a schematic configuration of an optical filter device of a fifth embodiment.

FIG. 9 is a plan view illustrating a schematic configuration of an optical filter device 600D of the fifth embodiment.

As illustrated in FIG. 9, the pair of fixation portions 7 are provided at mutually opposing positions of a pair of side surfaces 529A and 529B intersecting the side surface 528 corresponding to the side between the vertexes C3 and C4 in the electric component portion 526. In other words, in the present embodiment, the side surfaces 529A and 529B are parallel to each other, and the side surface 529A corresponds to a first side surface, and the side surface 529B corresponds to a second side surface. In addition, the fixation portions 7 are formed with the electric component portion 526 interposed therebetween at positions which are symmetrical to each other with respect to a virtual plane P which passes through the plane central point O of the wavelength variable interference filter 5.

Operations and Effects of Fifth Embodiment

In the present embodiment, the fixation portions 7 are respectively provided so as to oppose each other at the pair of side surfaces 529A and 529B of the movable substrate 52.

In this configuration, the plurality of fixation portions 7 are provided, and the substrate is fixed to the casing 610 at a plurality of positions. Accordingly, it is possible to increase a fixation force to the casing 610 and thus to more reliably fix the substrate to the casing 610.

In addition, since the fixation portions 7 are provided at mutually opposing positions, a stress applied to the movable substrate 52 from one fixation portion 7 can be canceled out by a stress from the other fixation portion 7, and thus to more effectively minimize deflection of the movable substrate 52.

Sixth Embodiment

Next, a sixth embodiment will be described with reference to the drawings.

The present embodiment is different from the above-described embodiments in that the fixation portion is provided between the corner (vertex) of the wavelength variable interference filter and the corner of the sidewall portion of the base.

Figure 10:
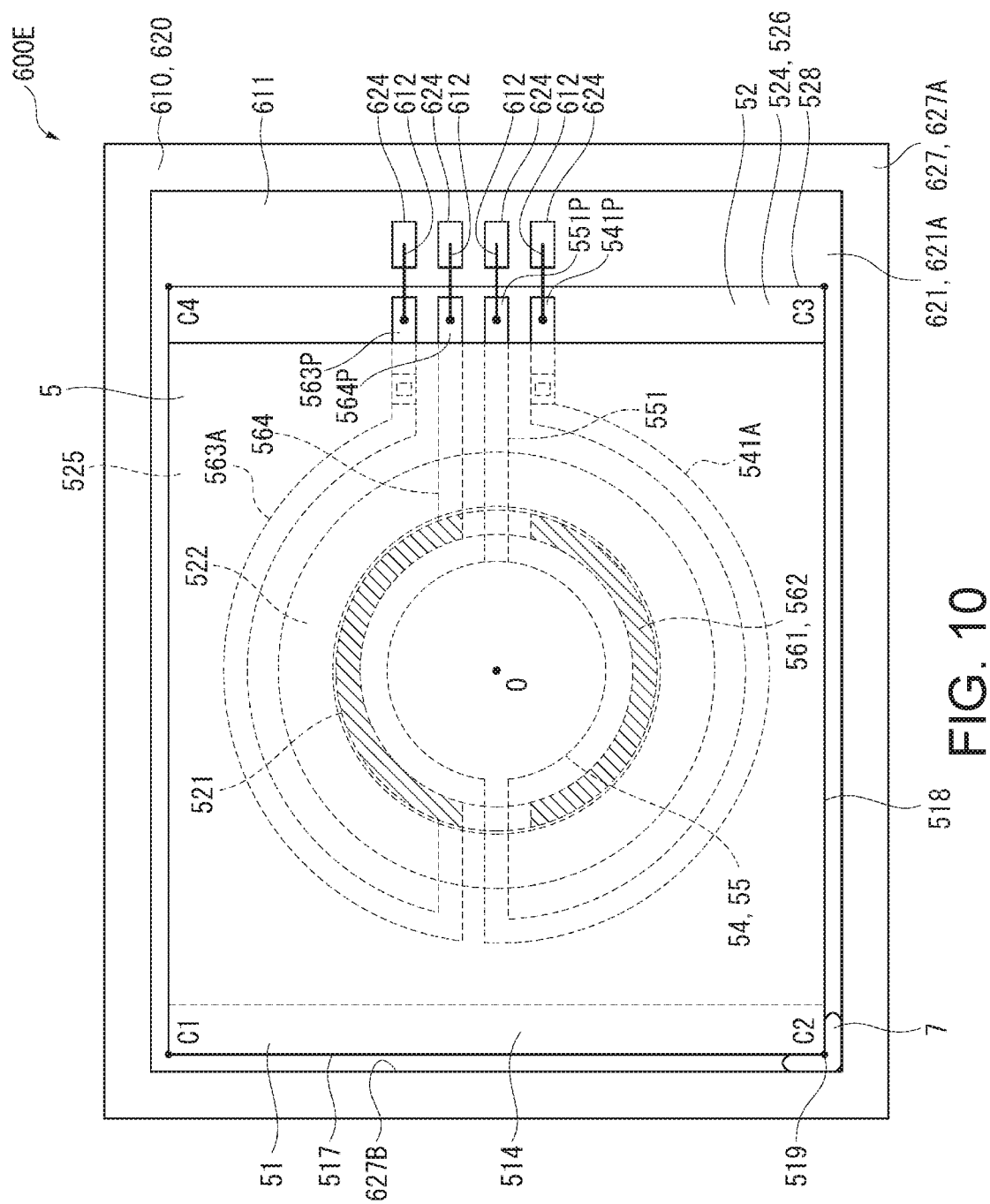
FIG. 10 is a plan view illustrating a schematic configuration of an optical filter device of a sixth embodiment.

FIG. 10 is a plan view illustrating a schematic configuration of an optical filter device 600E of the sixth embodiment.

In the present embodiment, as illustrated in FIG. 10, the fixation portion 7 includes a corner 519 at which a vertex (for example, the vertex C2) of the fixed substrate 51 is located, and is provided over the side surfaces 517 and 518 adjacent to the corner 519. In addition, the fixation portion 7 joins the side surfaces 517 and 518 to the inner surface 627B of the sidewall portion 627 at the corner 519. In other words, in the present embodiment, the side surface 517 corresponds to a first side surface. Further, the side surface 518 corresponds to a third side surface, and intersects the side surface 517 along the plane intersecting the side surface 517 so as to form the corner 519. The fixation portion 7 is provided over the side surface 517 (first side surface) and the side surface 518 (third side surface).

Operations and Effects of Sixth Embodiment

In the present embodiment, the fixation portion 7 is provided across the corner 519 of the fixed substrate 51 over the two adjacent side surfaces 517 and 518. In this configuration, in the same manner as in the first, second and fourth embodiments in which the fixation portion is provided only on a single side surface of the substrate, it is possible to perform fixation of the wavelength variable interference filter 5 with a simple operation in which the fixed substrate 51 coated with an adhesive is pressed against the inner surface 627B.

In addition, since the fixed substrate 51 is fixed to the casing 610 at a plurality of positions of the two side surfaces 517 and 518, it is possible to increase a fixation force to the casing 610 and thus to more reliably fix the wavelength variable interference filter 5 to the casing 610.

The wavelength variable interference filter 5 is provided with main members which have influence on spectral accuracy of the wavelength variable interference filter 5, such as the respective reflective films 54 and 55 or the movable portion 521 and the holding portion 522 forming the electrostatic actuator, centering on the plane central point O.

In addition, since the fixation portion 7 is disposed at the corner 519 which is spaced apart from the central position (plane central point O) of the fixed substrate 51 in the filter plan view, it is possible to minimize delivery of a stress of the fixation portion 7 to the main members provided around the plane central point O and thus to more effectively prevent a reduction in spectral accuracy.

Seventh Embodiment

Next, a seventh embodiment will be described with reference to the drawings.

In the above-described respective embodiments, the casing has the sidewall portion 627 to which the wavelength variable interference filter 5 can be fixed, and the wavelength variable interference filter 5 is fixed to the inner surface 627B of the sidewall portion 627 by the fixation portion 7. In an optical filter device of the present embodiment, the casing does not have the sidewall portion to which the wavelength variable interference filter 5 can be fixed, and, alternatively, has a support portion which supports the wavelength variable interference filter 5.

Figure 11:
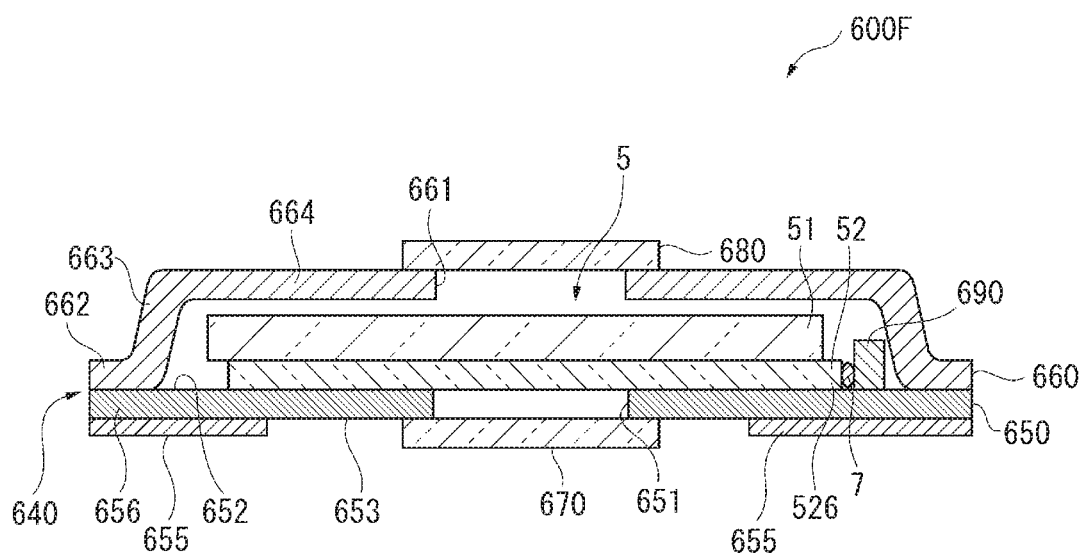
FIG. 11 is a cross-sectional view illustrating a schematic configuration of an optical filter device of a seventh embodiment.

FIG. 11 is a cross-sectional view illustrating a schematic configuration of an optical filter device 600F of the seventh embodiment.

As illustrated in FIG. 11, the optical filter device 600F includes the wavelength variable interference filter 5 and a casing 640 which stores the wavelength variable interference filter 5 therein.

The casing 640 is provided with abase substrate 650, a lid 660, a base side glass substrate 670, and a lid side glass substrate 680.

The base substrate 650 is provided with the movable substrate 52 of the wavelength variable interference filter 5, and is formed of, for example, a single layer ceramic substrate. In addition, a light passing hole 651 is opened and formed on the base substrate 650 in a region opposing an effective region Ar0. In addition, the base side glass substrate 670 is joined so as to cover the light passing hole 651. A joining method of the base side glass substrate 670 may use, for example, glass frit joining using a glass frit which is a piece of glass obtained by melting a glass raw material at a high temperature and then rapidly cooling the material, joining using an epoxy resin, or the like.

Figure 12:
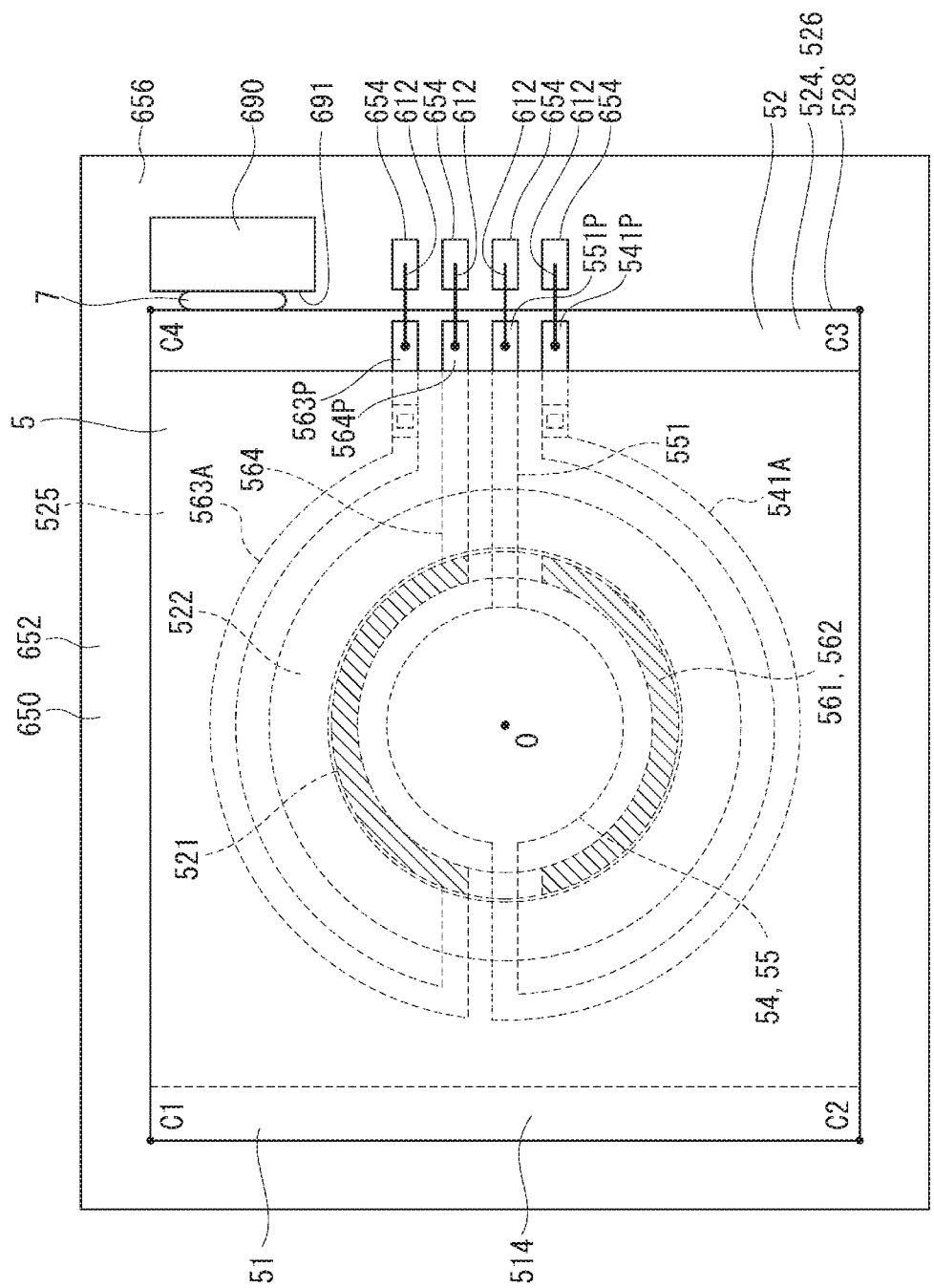
FIG. 12 is a plan view illustrating a schematic configuration of a wavelength variable interference filter of the embodiment.

FIG. 12 is a plan view illustrating the base substrate 650 and the wavelength variable interference filter 5 disposed on the base substrate 650.

As illustrated in FIG. 12, internal terminal portions 654 are provided so as to respectively correspond to the electrode pads 541P, 551P, 563P and 564P of the wavelength variable interference filter 5 on a base inner surface 652 of the base substrate 650 facing the lid 660. In addition, connection between respective extraction electrodes 563 and 564 and the internal terminal portions 654 are performed by using wire bonding. Further, connection is not limited to using the wire bonding, and, for example, an FPC or the like may be used.

In addition, the base substrate 650 is provided with through-holes (not illustrated) so as to respectively correspond to the internal terminal portions 654. The internal terminal portions 654 are connected to external terminal portions 655 (refer to FIG. 11) which are provided on a base outer surface 653 on an opposite side to the base inner surface 652 of the base substrate 650 via conductive members which fill the through-holes.

Further, a base joining portion 656 which is joined to the lid 660 is provided at the outer circumference of the base substrate 650.

As illustrated in FIG. 12, the base substrate 650 is provided with a support portion 690 which supports the wavelength variable interference filter 5 and fixes the wavelength variable interference filter 5 to the casing 640. The support portion 690 has, for example, a rectangular parallelepiped shape, and is provided at a position adjacent to the internal terminal portions 654 in the filter plan view. The support portion 690 has a side surface 691 facing the wavelength variable interference filter 5 as a planarized surface, and the planarized surface is provided so as to be parallel to the arrangement direction of the plurality of internal terminal portions 654. The side surface 528 of the movable substrate 52 of the wavelength variable interference filter 5 is fixed to the side surface 691 by the fixation portion 7, and is fixed to the casing 640 via the support portion 690. The support portion 690 may be formed of, for example, a ceramic and may be provided separately from the base substrate 650, and a part of the base substrate 650 may be made to protrude so as to be used as the support portion 690.

As illustrated in FIG. 11, the lid 660 includes a lid joining portion 662 which is joined to the base joining portion 656, a sidewall portion 663 which rises from the lid joining portion 662, and a ceiling portion 664 which is continued to the sidewall portion 663 and covers the wavelength variable interference filter 5. The lid 660 is made of, for example, an alloy such as Kovar, or a metal.

The lid 660 is closely joined to the base substrate 650 through joining between the lid joining portion 662 and the base joining portion 656 of the base substrate 650.

A joining method thereof may use, for example, not only laser welding, but also soldering using silver solder, sealing using a eutectic alloy layer, welding using a low melting point glass, glass attachment, glass frit joining, adhesion using an epoxy resin, and the like. These joining methods may be selected as appropriate depending on materials of the base substrate 650 and the lid 660, joining circumstances, and the like.

The ceiling portion 664 of the lid 660 is parallel to the base substrate 650. A light passing hole 661 is opened and formed in a region facing the effective region Ar0 of the wavelength variable interference filter 5 at the ceiling portion 664. In addition, the lid side glass substrate 680 is joined so as to cover the light passing hole 661. A joining method of the lid side glass substrate 680 may use, for example, glass frit joining, adhesion using an epoxy resin or the like, and the like in the same manner as the joining of the base side glass substrate 670.

Operations and Effects of Seventh Embodiment

In the present embodiment, the casing 640 includes the support portion 690 which supports the wavelength variable interference filter 5, and the wavelength variable interference filter 5 is fixed to the support portion 690 by the fixation portion 7. Accordingly, even in a configuration of the casing 640 in which the base substrate 650 on which the wavelength variable interference filter 5 is disposed does not have a sidewall portion, fixation of the side surface of the movable substrate 52 of the wavelength variable interference filter 5 can be performed by the fixation portion 7.

Eighth Embodiment

Next an eighth embodiment will be described with reference to the drawings.

In the eighth embodiment, a description will be made of a colorimetry sensor 3 which is an optical module into which the optical filter device 600 of the first embodiment is incorporated, and a colorimetry apparatus 1 into which the optical filter device 600 is incorporated.

Schematic Configuration of Colorimetry Apparatus

Figure 13:
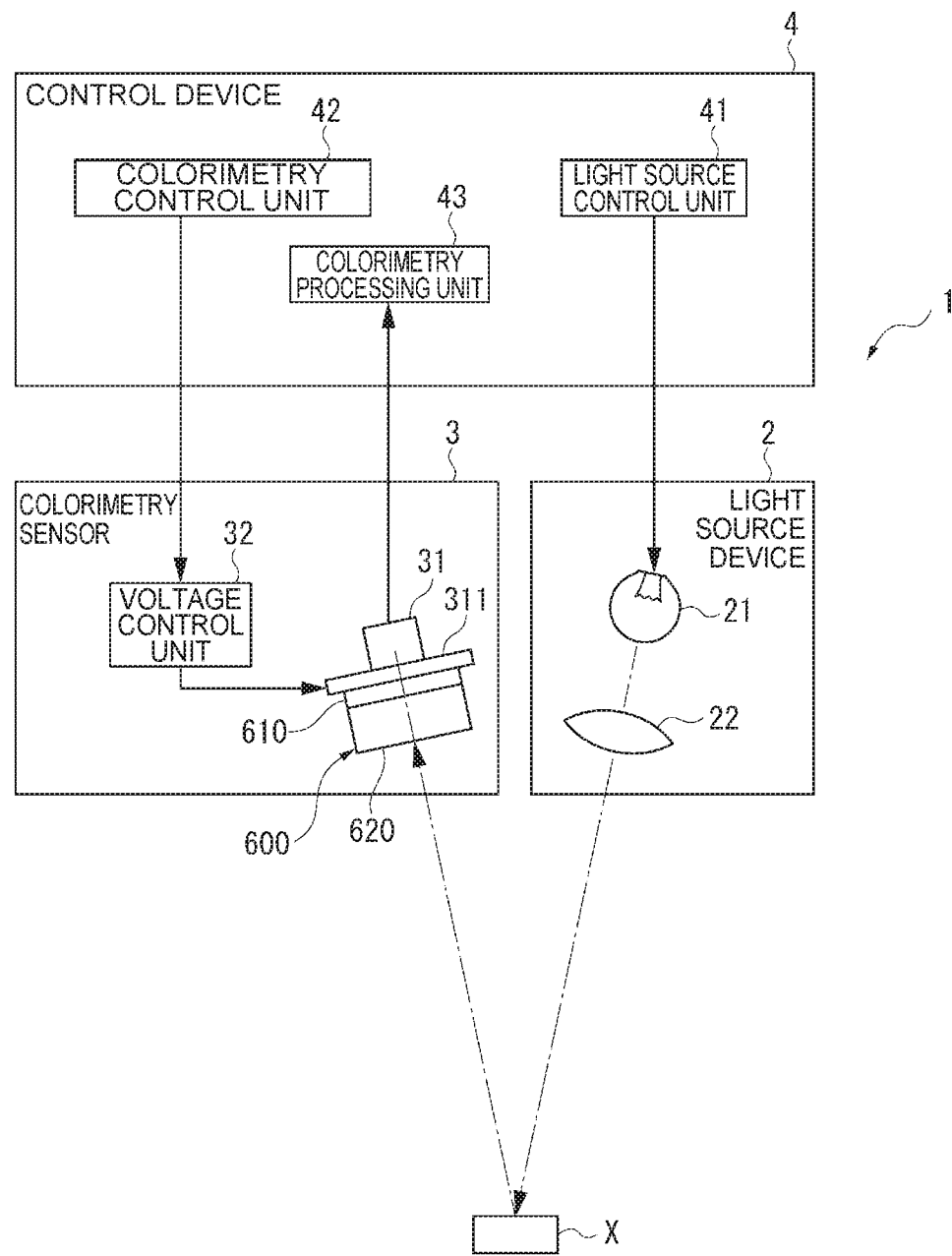
FIG. 13 is a block diagram illustrating a schematic configuration of a colorimetry apparatus of an eighth embodiment.

FIG. 13 is a block diagram illustrating a schematic configuration of the colorimetry apparatus 1.

The colorimetry apparatus 1 is an example of an electronic apparatus. The colorimetry apparatus 1, as illustrated in FIG. 13, includes a light source device 2 which emits light to an inspection target X, a colorimetry sensor 3, and a control device 4 which controls an entire operation of the colorimetry apparatus 1. In addition, the colorimetry apparatus 1 is an apparatus in which light emitted from the light source device 2 is reflected by the inspection target X, and reflected inspection target light is received by the colorimetry sensor 3. Further, the colorimetry apparatus 1 analyzes and measures a chromaticity of the inspection target light, that is, a color of the inspection target X on the basis of a detection signal output from the colorimetry sensor 3 which has received the light.

Configuration of Light Source Device

The light source device 2 includes a light source 21 and a plurality of lenses 22 (only one lens is illustrated in FIG. 13), and emits, for example, white light to the inspection target X. In addition, the plurality of lenses 22 may include a collimator lens, and, in this case, the light source device 2 converts the white light emitted from the light source 21 into parallel light by using the collimator lens, and emits the parallel light toward the inspection target X from a projection lens (not illustrated). Further, in the present embodiment, the colorimetry apparatus 1 including the light source device 2 is exemplified, but, for example, in a case where the inspection target X is a light emitting member such as a liquid crystal panel, the light source device 2 may not be provided.

Configuration of Colorimetry Sensor

The colorimetry sensor 3 constitutes an optical module, and includes the optical filter device 600 of the first embodiment. The colorimetry sensor 3, as illustrated in FIG. 13, includes the optical filter device 600, a detection unit 31 which receives light transmitted through the optical filter device 600, and a voltage control unit 32 which changes a wavelength of light transmitted through the wavelength variable interference filter 5.

In addition, the colorimetry sensor 3 includes an incidence optical lens (not illustrated) which guides light (inspection target light) reflected by the inspection target X to inside thereof at a position opposing the wavelength variable interference filter 5. Further, in the colorimetry sensor 3, light of a predetermined wavelength among inspection target light beams which are incident from the incidence optical lens is spectrally diffracted by the wavelength variable interference filter 5 of the optical filter device 600, and the spectrally diffracted light is received by using the detection unit 31.

The detection unit 31 is formed by a plurality of photoelectric conversion elements, and generates an electrical signal corresponding to a light reception amount. Here, the detection unit 31 is connected to the control device 4, for example, via a circuit board 311, and outputs the generated electrical signal to the control device 4 as a light reception signal.

In addition, the external terminal portions 626 formed on the base outer surface 621B of the casing 610 is connected to the circuit board 311, and is connected to the voltage control unit 32 via circuits formed on the circuit board 311.

In this configuration, the optical filter device 600 and the detection unit 31 can be integrally formed via the circuit board 311, and thus it is possible to simplify a configuration of the colorimetry sensor 3.

The voltage control unit 32 is connected to the external terminal portions 626 of the optical filter device 600 via the circuit board 311. In addition, the voltage control unit 32 applies a predetermined step voltage between the fixed electrode pad 563P and the movable electrode pad 564P on the basis of a control signal input from the control device 4, so as to drive the electrostatic actuator 56. Accordingly, an electrostatic attraction occurs in the gap between the electrodes so as to deflect the holding portion 522, and thus the movable portion 521 is displaced to the fixed substrate 51 side, thereby allowing the gap G1 between the reflective films to be set to a desired dimension.

Configuration of Control Device

The control device 4 is controls an entire operation of the colorimetry apparatus 1.

As the control device 4, for example, a general purpose personal computer, a portable information terminal, a colorimetry-dedicated computer, or the like may be used.

In addition, the control device 4, as illustrated in FIG. 13, includes a light source control unit 41, a colorimetry control unit 42, a colorimetry processing unit 43, and the like.

The light source control unit 41 is connected to the light source device 2. In addition, the light source control unit 41 outputs a predetermined control signal to the light source device 2 on the basis of, for example, an input set by a user, so as to allow white light with predetermined brightness to be emitted from the light source device 2.

The colorimetry control unit 42 is connected to the colorimetry sensor 3. In addition, the colorimetry control unit 42 sets a wavelength of light which is to be received by the colorimetry sensor 3 on the basis of, for example, an input set by a user, and outputs a control signal for detecting a light reception amount of the light with the wavelength to the colorimetry sensor 3. Accordingly, the voltage control unit 32 of the colorimetry sensor 3 sets a voltage applied to the electrostatic actuator 56 so that only the wavelength of light desired by the user is transmitted, on the basis of the control signal.

The colorimetry processing unit 43 analyzes a chromaticity of the inspection target X on the basis of the light reception amount detected by the detection unit 31.

Operations and Effects of Eighth Embodiment

The colorimetry apparatus 1 of the present embodiment includes the optical filter device 600 which is the same as that of the first embodiment. As described above, according to the optical filter device 600, since the fixation portion 7 is provided on the side surface 517 of the fixed substrate 51 of the wavelength variable interference filter 5 so that the wavelength variable interference filter 5 is fixed to the casing 610, it is possible to minimize deflection of the fixed substrate 51 and the movable substrate 52. For this reason, it is possible to prevent deterioration in spectral accuracy of the wavelength variable interference filter 5. In addition, since the optical filter device 600 has high air-tightness of the inner space, and has no permeation of a foreign substance such as a water particle, it is also possible to prevent optical characteristics of the wavelength variable interference filter 5 from being changed by such a foreign substance. Therefore, also in the colorimetry sensor 3, it is possible to detect light with a desired wavelength extracted with a high resolution by using the detection unit 31 and thus to detect an accurate light amount for the light with the desired wavelength. Accordingly, the colorimetry apparatus 1 can perform accurate color analysis of the inspection target X.

Modifications of Embodiments

In addition, the invention is not limited to the above-described embodiments, and modifications, alterations, and the like in the scope in which the object of the invention can be achieved are included in the invention.

For example, in the above-described respective embodiments, fixation of either of the fixed substrate 51 and the movable substrate 52 is performed by the fixation portion 7, but the invention is not limited thereto, and fixation of both of the fixed substrate 51 and the movable substrate 52 may be performed by the fixation portion 7. However, in this case, if a material having a linear expansion coefficient which is considerably different from that of the fixed substrate 51 or the movable substrate 52 is used, or an adhesive having a greater compression force in the thickness direction than rigidity of the joining film 53 is used as the fixation portion 7, this causes the fixed substrate 51 and the movable substrate 52 to be tilted or a gap dimension to be changed. Therefore, as in the above-described respective embodiments, the fixation portion 7 is preferably provided on either of the fixed substrate 51 and the movable substrate 52.

In the respective embodiments excluding the sixth embodiment, one or two fixation portions 7 are provided on any one of the side surfaces 517 and 518 of the fixed substrate 51 and the side surfaces 528 and 529 of the movable substrate 52, but the invention is not limited thereto. For example, three or more fixation portions 7 may be provided on any one of the side surfaces of the respective substrates 51 and 52. In addition, one entire side surface may be covered with a single fixation portion 7, and any area of a single fixation portion 7 may be set. It is possible to improve a fixation force by increasing the number of fixation portions 7 or an area of a single fixation portion 7. However, from the viewpoint of minimizing application of a stress to the substrates 51 and 52 from the fixation portion 7, a joining area of the fixation portion 7 is preferably reduced by reducing the number of fixation portions 7 and reducing an area of a single fixation portion 7. In addition, in the configuration of the seventh embodiment, a plurality of support portions 690 may be provided in accordance with fixation positions.

In the fifth embodiment, the fixation portions 7 are respectively provided near the vertexes C3 and C4 adjacent to each other of the rectangular movable substrate 52, but the invention is not limited thereto, and a plurality of fixation portions may be provided so that a plurality of sets each of which includes a pair of mutually opposing fixation portions are formed.

For example, the fixation portions 7 may be respectively provided near the vertexes C1 and C2 adjacent to each other of the fixed substrate 51.

In the sixth embodiment, the fixation portion 7 is provided at a single corner, but the invention is not limited thereto, and the fixation portions 7 may be provided at a plurality of corners. In addition, the fixation portions 7 may be provided not only at the corners but also on the side surfaces.

For example, the fixation portions 7 may be provided at positions of the vertexes C2 and C3 of the fixed substrate 51. In addition, as described in the second embodiment, there may be a configuration in which the casing side projection 628 and the fixation portion 7 is provided at a position of the vertex C3 of the movable substrate 52, a configuration in which the casing side projections 628 and 629 are provided and the fixation portions 7 are provided at the vertexes C3 and C4 of the movable substrate 52, or the like.

In the above-described respective embodiments, a configuration has been exemplified in which the wavelength variable interference filter 5 is provided in the casing so that the movable substrate 52 is in contact with the pedestal portion 621 of the base 620, but the invention is not limited thereto. For example, the wavelength variable interference filter 5 may be provided in the casing so that the fixed substrate 51 is in contact with the pedestal portion 621.

In addition, as in the above-described respective embodiments, an opening edge of the light exit hole 622 may be disposed at a position of the movable substrate 52 opposing the holding portion 522 by disposing the movable substrate 52 at the pedestal portion 621. In this case, for example, even in a case where protrusions occur such as burrs along the opening edge when the base 620 is formed, the protrusions can be released to an etching space of the holding portion 522, and thus it is possible to minimizing tilting or the like of the movable substrate 52.

In the above-described respective embodiments, a configuration has been exemplified in which a voltage is applied to the fixed electrode 561 and the movable electrode 562 of the wavelength variable interference filter 5 so that a size of the gap G1 between the reflective films is changed by an electrostatic attraction, but the invention is not limited thereto. For example, a dielectric actuator, in which a first dielectric coil is disposed instead of the fixed electrode 561, and a second dielectric coil or a permanent magnet is disposed instead of the movable electrode 562, may be used as an actuator which changes the gap G1 between the reflective films.

In addition, a piezoelectric actuator may be used instead of the electrostatic actuator 56. In this case, for example, a lower electrode layer, a piezoelectric film, and an upper electrode layer may laminated and disposed at the holding portion 522, and a voltage applied between the lower electrode layer and the upper electrode layer is varied as an input value so as to expand and contract the piezoelectric film, thereby deflecting the holding portion 522.

In the above-described respective embodiments, the wavelength variable interference filter 5 which allows a size of the gap G1 between the reflective films to be changed has been exemplified, but the invention is not limited thereto, and an interference filter in which a size of the gap G1 between the reflective films is not changed may be used.

In addition, in the above-described respective embodiments, the wavelength variable interference filter 5 provided with the rectangular substrates 51 and 52 has been exemplified, but the invention is not limited thereto. For example, a shape of each of the substrates 51 and 52 in the filter plan view may be not only a rectangular shape but also various polygonal shapes, and may be a circular shape or an elliptical shape. Further, the substrates 51 and 52 may have a curved side surface.

Furthermore, in the above-described respective embodiments, the wavelength variable interference filter 5 has been exemplified which includes the pair of substrates 51 and 52 and the pair of reflective films 54 and 55 which are respectively provided on the substrates 51 and 52, but the invention is not limited thereto. For example, the movable substrate 52 may not be provided, and the fixed substrate 51 may be fixed to the casing 610. In this case, for example, a first reflective film, a gap spacer, and a second reflective film are laminated and formed on one surface of a substrate (for example, the fixed substrate), and the first reflective film and the second reflective film oppose each other with a gap. The configuration is formed by using a single substrate, and thus it is possible to further thin a spectroscopic element.

In addition, in the above-described respective embodiments, the optical filter device has been exemplified in which the wavelength variable interference filter or the interference filter is stored in the casing, but the invention is not limited thereto.

For example, the invention is also suitably applicable to a MEMS device in which a MEMS element is stored in a casing.

The MEMS element may exemplify an optical element such as, for example, a mirror device which can minutely change a light reflection direction. Also in this configuration, it is possible to minimize deflection of a substrate included in the optical element, and thus to prevent a stress from being applied to an optical member included in the optical element. Therefore, it is possible to prevent deterioration optical characteristics of the optical element.

Further, the MEMS element may exemplify various MEMS elements which are stored in a casing for the purpose of performance improvement, deterioration prevention, or the like, such as a piezoelectric vibration element (for example, a quartz crystal vibrator, a ceramic vibrator, or a silicon vibrator), a pressure sensor element, an acceleration sensor element, or a gyro sensor element.

In the piezoelectric vibration element, it is possible to minimize deflection of a substrate so as to minimize application of a stress to a vibrator, and thus to prevent a vibration characteristic from being changed. In the pressure sensor element, it is possible to minimize application of a stress to a diaphragm, and thus it is possible to prevent a reduction in detection accuracy due to deformation of the diaphragm. Also in the acceleration sensor element or the gyro sensor element, similarly, it is possible to minimize application of a stress to a detection unit which is provided on the substrate so as to detect acceleration or angular velocity, and thus it is possible to prevent a reduction in detection accuracy.

In addition, the colorimetry apparatus 1 has been exemplified as the electronic apparatus in the eighth embodiment, but the optical filter device, the optical module, and the electronic apparatus may be used in various fields.

Hereinafter, modification examples of the electronic apparatus using the optical filter device will be described. In addition, the electronic apparatuses exemplified below include the optical filter device 600, and the wavelength variable interference filter 5 is fixed to the casing 610 by the fixation portion 7.

The electronic apparatus may be used as an optical base system for detecting presence of a specific substance. Such a system may exemplify an in-vehicle gas leakage detector which employs a spectrometry method using, for example, the wavelength variable interference filter included in the optical filter device, and detects a specific gas with high sensitivity, or a gas detection apparatus such as a photoacoustic rare gas detector for testing expiration.

An example of such a gas detection apparatus will be described below with reference to the drawings.

Figure 14:
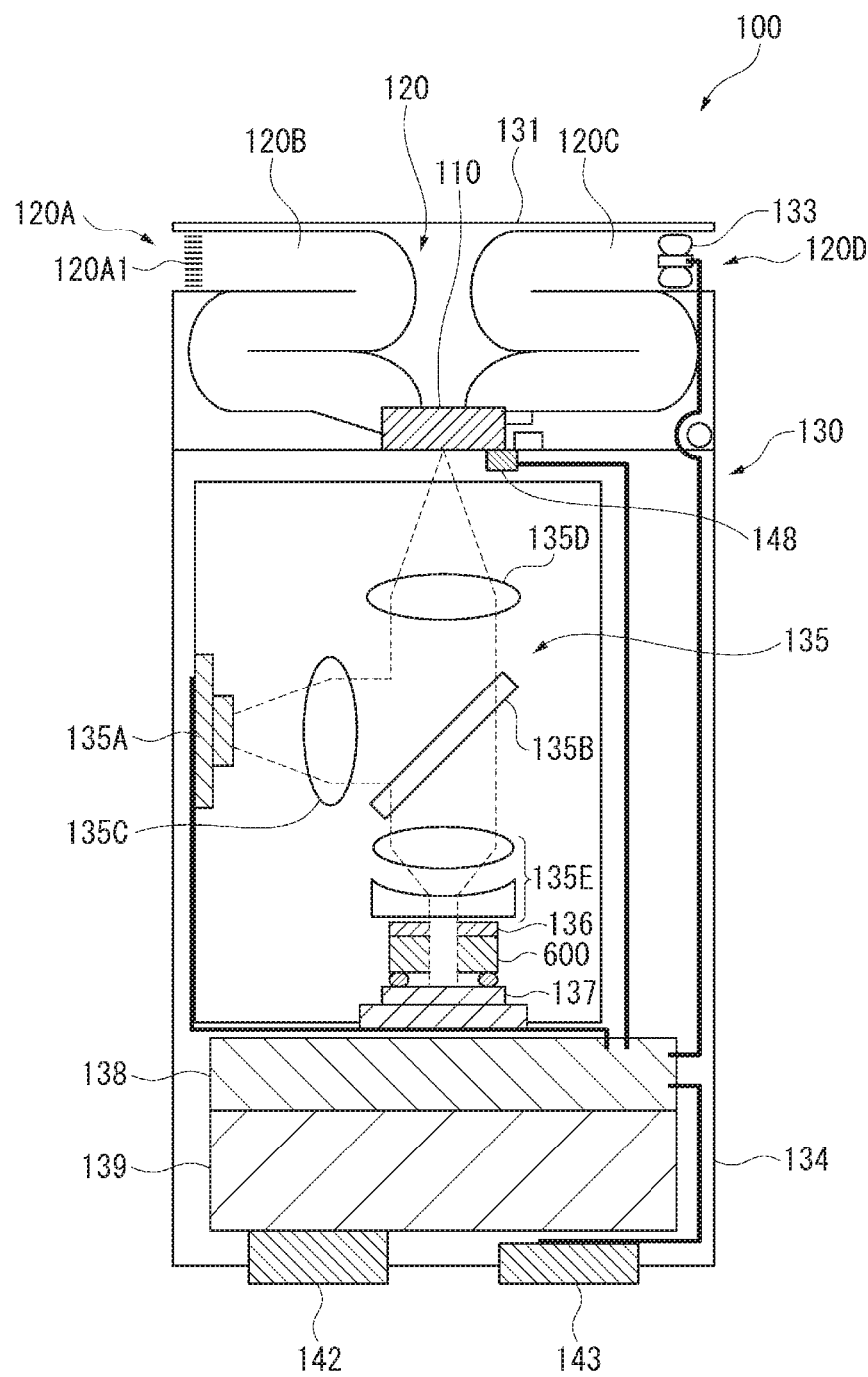
FIG. 14 is a schematic diagram illustrating a gas detection apparatus which is an example of an electronic apparatus.

FIG. 14 is a schematic diagram illustrating an example of a gas detection apparatus having the wavelength variable interference filter.

Figure 15:
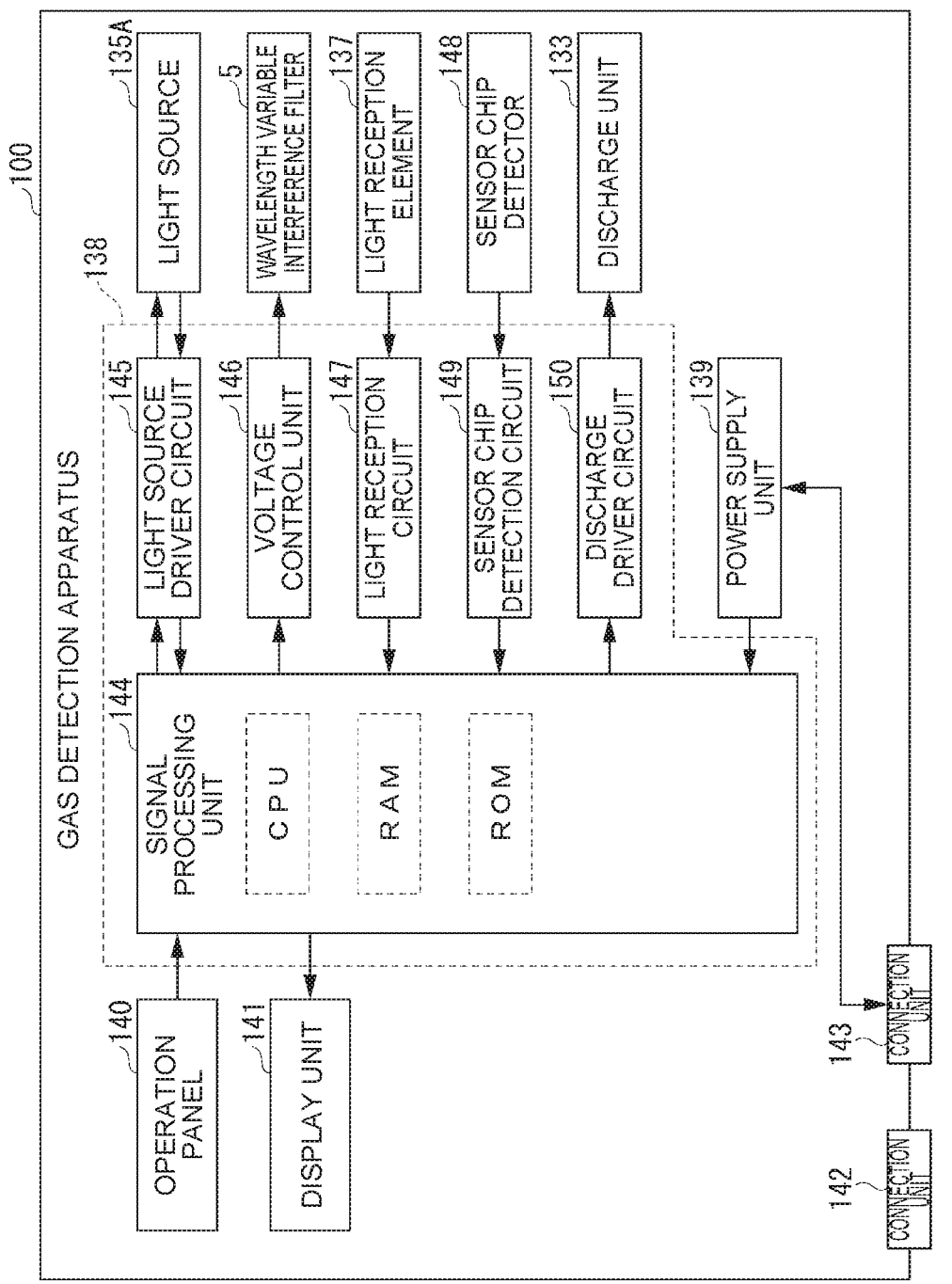
FIG. 15 is a block diagram illustrating a configuration of a control system of the gas detection apparatus of FIG. 14.

FIG. 15 is a block diagram illustrating a configuration of a control system of the gas detection apparatus of FIG. 14.

The gas detection apparatus 100, as illustrated in FIG. 14, includes a sensor chip 110, a flow channel 120 having a suction port 120A, a suction flow channel 120B, a discharge flow channel 120C, and a discharge port 120D, and a main body 130.

The main body 130 is constituted by a detection device including a sensor unit cover 131 having an opening which allows the flow channel 120 to be attachable and detachable, a discharge unit 133, a casing 134, an optical unit 135, a filter 136, the optical filter device 600, a light reception element 137 (detection unit), and the like; a controller 138 which controls the detection unit; a power supply unit 139 which supplies power; and the like. In addition, the optical unit 135 includes a light source 135A which emits light; a beam splitter 135B which reflects light incident from the light source 135A to the sensor chip 110 side and transmits light incident from the sensor chip side through the light reception element 137 side; and lenses 135C, 135D and 135E.

In addition, as illustrated in FIG. 14, an operation panel 140, a display unit 141, a connection unit 142 for interfacing with external devices, and the power supply unit 139 are provided on a surface of the gas detection apparatus 100. In a case where the power supply unit 139 is a secondary battery, a connection unit 143 for charging may be provided.

Further, the controller 138 of the gas detection apparatus 100, as illustrated in FIG. 15, includes a signal processing unit 144 constituted by a CPU and the like; a light source driver circuit 145 which controls the light source 135A; a voltage control unit 146 which controls the wavelength variable interference filter 5 of the optical filter device 600; a light reception circuit 147 which receives a signal from the light reception element 137; a sensor chip detection circuit 149 receiving a signal from a sensor chip detector 148 which reads a code of the sensor chip 110 and detects presence or absence of the sensor chip 110; a discharge driver circuit 150 which controls the discharge unit 133; and the like.

Next, an operation of the above-described gas detection apparatus 100 will be described below.

The sensor chip detector 148 is provided inside the sensor unit cover 131 on the upper part of the main body 130, and detects presence or absence of the sensor chip 110. When a detection signal from the sensor chip detector 148 is detected, the signal processing unit 144 determines that the sensor chip 110 is installed, and outputs a display signal for displaying that a detection operation can be performed on the display unit 141.

In addition, for example, when the operation panel 140 is operated by a user, and an instruction signal indicating that a detection process starts is output from the operation panel 140 to the signal processing unit 144, first, the signal processing unit 144 outputs a signal for starting the light source to the light source driver circuit 145 so as to start the light source 135A. When the light source 135A starts to be driven, laser light having a single wavelength and stable linear polarization is emitted from the light source 135A. In addition, the light source 135A has a built-in temperature sensor or a light amount sensor, and outputs information thereon to the signal processing unit 144. Further, the signal processing unit 144 controls the discharge driver circuit 150 so as to start the discharge unit 133 when it is determined that the light source 135A is stably operated on the basis of a temperature or a light amount input from the light source 135A. Accordingly, a gas sample including a target substance (gas molecules) to be detected is guided from the suction port 120A to the suction flow channel 120B, the inside of the sensor chip 110, the discharge flow channel 120C, and the discharge port 120D. Furthermore, the suction port 120A is provided with a dust removing filter 120A1, and relatively large dust, some water vapor, or the like is removed.

The sensor chip 110 is a sensor into which a plurality of metal nano-structure bodies are incorporated, and which uses localized surface plasmon resonance. In this sensor chip 110, if an enhanced electric field is formed between the metal nano-structure bodies by laser light, and gas molecules enter the enhanced electric field, Raman scattering light and Rayleigh scattering light including molecular vibration information are generated.

The Raman scattering light and Rayleigh scattering light are incident to the filter 136 through the optical unit 135 so that the Rayleigh scattering light is separated by the filter 136, and the Raman scattering light is incident to the optical filter device 600. In addition, the signal processing unit 144 controls the voltage control unit 146 so as to adjust a voltage applied to the wavelength variable interference filter 5 of the optical filter device 600, and thus the Raman scattering light corresponding to the gas molecule which is a detection target is spectrally diffracted by the wavelength variable interference filter 5 of the optical filter device 600. Next, when the spectrally diffracted light is received by the light reception element 137, a light reception signal corresponding to the light reception amount is output to the signal processing unit 144 via the light reception circuit 147.

The signal processing unit 144 compares spectral data on the Raman scattering light corresponding to the gas molecule which is a detection target, obtained in this way, with data stored in a ROM, and determines whether or not the gas molecule is a target gas molecule so as to specify a substance. In addition, the signal processing unit 144 displays result information on the display unit 141, or outputs the result information from the connection unit 142 to an external device.

In addition, in FIGS. 14 and 15, the gas detection apparatus 100 has been exemplified in which Raman scattering light is spectrally diffracted by the wavelength variable interference filter 5 of the optical filter device 600, and a gas is detected from the spectrally diffracted Raman scattering light. In addition, a gas detection apparatus may be used which specifies the kind of gas by detecting absorbance unique to a gas. In this case, a gas sensor, which allows a gas to flow into the sensor and detects light which is absorbed by the gas among incident light beams, is used as the optical module. In addition, a gas detection apparatus which analyzes and discriminates the gas which is made to flow into the sensor by the gas sensor is used as the electronic apparatus. Also with this configuration, it is possible to detect a component of a gas by using the wavelength variable interference filter.

In addition, a system for detecting presence of a specific substance is not limited to the above-described gas detection apparatus, and may exemplify a substance component analysis apparatus such as an apparatus for noninvasive measurement of a saccharide using near-infrared spectroscopy, or an apparatus for noninvasive measurement of information on food, a living body, a mineral, or the like.

Hereinafter, a food analysis apparatus will be described as an example of the substance component analysis apparatus.

Figure 16:
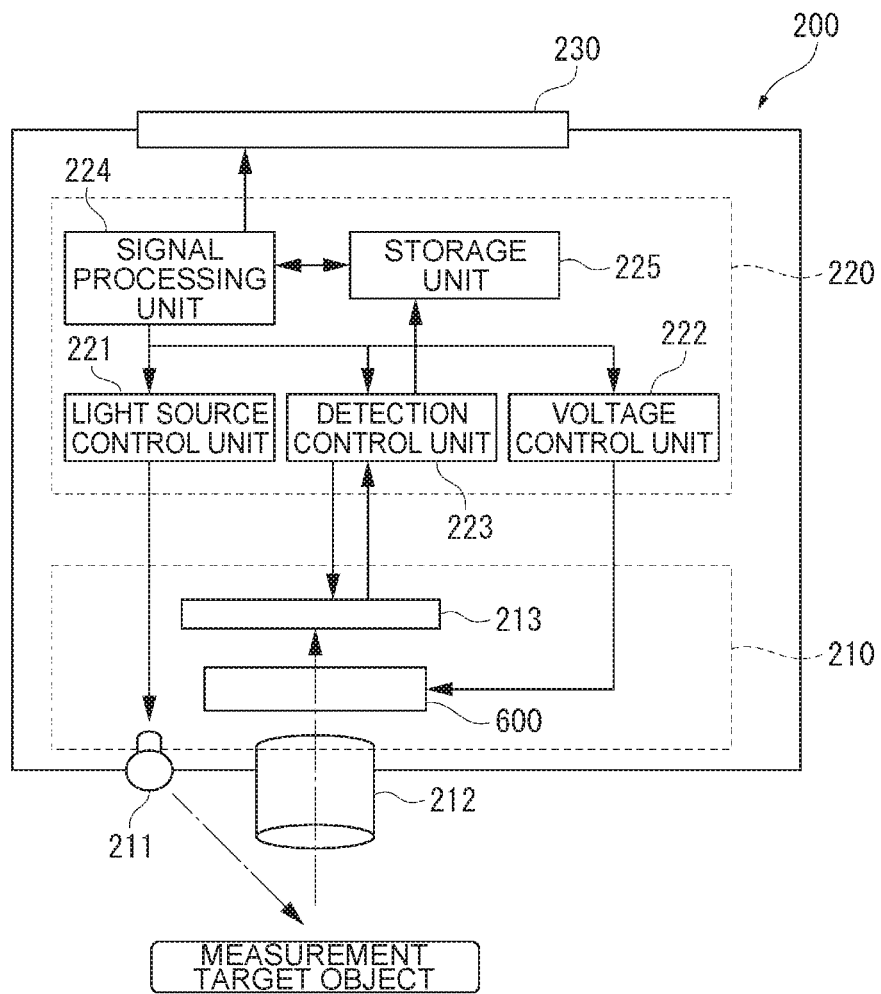
FIG. 16 is a diagram illustrating a schematic configuration of a food analysis apparatus which is an example of an electronic apparatus.

FIG. 16 is a diagram illustrating a schematic configuration of a food analysis apparatus which is an example of the electronic apparatus using the optical filter device 600.

The food analysis apparatus 200, as illustrated in FIG. 16, includes a detector 210 (optical module), a controller 220, and a display unit 230. The detector 210 includes a light source 211 which emits light; an imaging lens 212 into which light from a measurement target object is introduced; the optical filter device 600 which spectrally diffracts the light introduced from the imaging lens 212; and an imaging unit 213 (detection unit) which detects the spectrally diffracted light.

In addition, the controller 220 includes a light source control unit 221 which controls turning on and off the light source 211 and controls brightness during turning-on of the light source; a voltage control unit 222 which controls the wavelength variable interference filter 5 of the optical filter device 600; a detection control unit 223 which controls the imaging unit 213 so as to acquire a spectroscopic image captured by the imaging unit 213; a signal processing unit 224; and a storage unit 225.

When the system of the food analysis apparatus 200 is driven, the light source 211 is controlled by the light source control unit 221, and thus a measurement target object is irradiated with light by the light source 211. In addition, light reflected by the measurement target object is incident to the optical filter device 600 through the imaging lens 212. A voltage which allows a desired wavelength to be spectrally diffracted is applied to the wavelength variable interference filter 5 of the optical filter device 600 under the control of the voltage control unit 222, and the spectrally diffracted light is imaged by the imaging unit 213 formed by, for example, a CCD camera or the like. Further, the imaged light is accumulated in the storage unit 225 as a spectroscopic image. The signal processing unit 224 controls the voltage control unit 222 so as to change a value of a voltage applied to the wavelength variable interference filter 5, thereby acquiring a spectroscopic image for each wavelength.

The signal processing unit 224 performs a calculation process on pixel data of each image accumulated in the storage unit 225 so as to obtain a spectrum of each pixel. In addition, the storage unit 225 stores, for example, information regarding a component of food for a spectrum, and the signal processing unit 224 analyzes data on the obtained spectrum on the basis of the information regarding food stored in the storage unit 225 so as to obtain a food component included in a detection target and a content thereof. Further, food calorie, freshness, and the like can be calculated from the obtained food component and the content thereof. Furthermore, it is possible to perform extraction or the like of a part whose freshness is reduced in food which is an inspection target by analyzing a spectral distribution in an image, and it is also possible to detect a foreign substance included in the food.

In addition, the signal processing unit 224 performs a process of displaying information such as the component of the food which is an inspection target, the content, the calorie, and the freshness obtained in the above-described way on the display unit 230.

In addition, in FIG. 16, the food analysis apparatus 200 is exemplified, but may also be used as an apparatus for noninvasive measurement of the above-described other information by using the substantially same configuration. For example, the food analysis apparatus may be used as a living body analysis apparatus which performs analysis of a living body component, such as analysis and measurement of a component of a body fluid such as blood. If such a living body analysis apparatus is used as an apparatus which measures a component of a body fluid such as blood so as to detect ethyl alcohol therein, the apparatus may be used as an intoxicated driving prevention apparatus which detects a drunken state of a driver. Further, the food analysis apparatus may also be used as an electronic endoscope system including such a living body analysis apparatus.

In addition, the food analysis apparatus may also be used as a mineral analysis apparatus which performs a mineral component analysis.

Further, the wavelength variable interference filter, the optical module, and the electronic apparatus are applicable to the following apparatuses.

For example, data can be transferred by light with each wavelength by changing an intensity of the light of each wavelength over time. In this case, light with a specific wavelength is spectrally diffracted by the wavelength variable interference filter provided in an optical module and is received by a light reception unit, and thus data transferred by the light with a specific wavelength can be extracted. Therefore, data of light with each wavelength is processed by an electronic apparatus having the data extraction optical module, thereby allowing optical communication to be performed.

In addition, the electronic apparatus is applicable to a spectroscopic camera, a spectroscopic analyzer, and the like which capture a spectroscopic image by spectrally diffracting light with the wavelength variable interference filter included in the optical filter device. An example of the spectroscopic camera may include an infrared camera which has the built-in wavelength variable interference filter.

Figure 17:
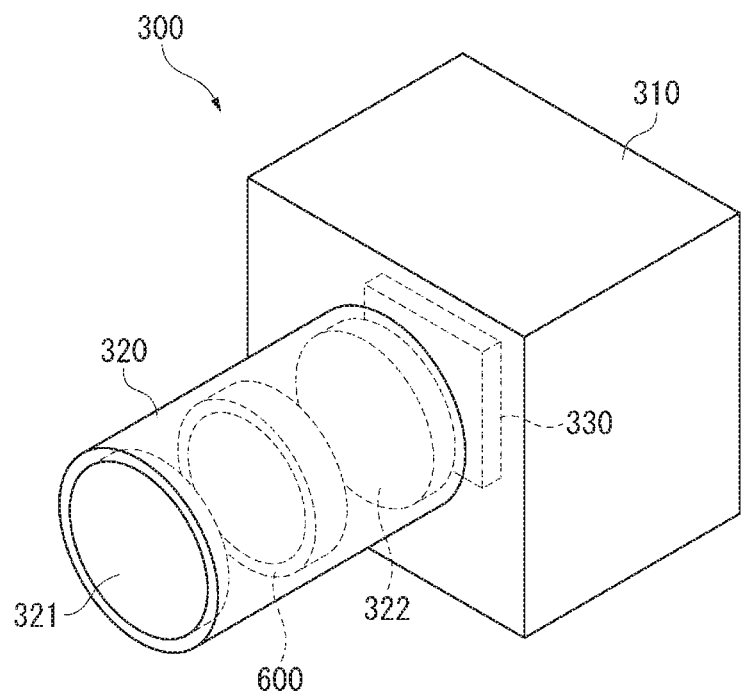
FIG. 17 is a diagram illustrating a schematic configuration of a spectroscopic camera which is an example of an electronic apparatus.

FIG. 17 is a diagram illustrating a schematic configuration of a spectroscopic camera. The spectroscopic camera 300, as illustrated in FIG. 17, includes a camera main body 310, an imaging lens unit 320, and an imaging unit 330 (detection unit).

The camera main body 310 is a part held and operated by a user.

The imaging lens unit 320 is provided in the camera main body 310, and guides incident image light to the imaging unit 330. In addition, the imaging lens unit 320, as illustrated in FIG. 17, includes an objective lens 321, an image forming lens 322, and the optical filter device 600 provided between the lenses.

The imaging unit 330 is formed by a light reception element, and images the image light guided by the imaging lens unit 320.

In the spectroscopic camera 300, the wavelength variable interference filter 5 of the optical filter device 600 transmits light with a wavelength which is an imaging target therethrough, and thus it is possible to capture a spectroscopic image of light with a desired wavelength.

In addition, the wavelength variable interference filter included in the optical filter device may be used as a band-pass filter, and may be used in, for example, an optical laser apparatus in which, among light beams in a predetermined wavelength band emitted by a light emitting element, only light in a narrow band centering on a predetermined wavelength is spectrally diffracted and transmitted by the wavelength variable interference filter.

Further, the wavelength variable interference filter included in the optical filter device may be used in a living body authentication apparatus, and is also applicable to, for example, authentication apparatuses of a blood vessel, a fingerprint, retina, iris, and the like, using light in a near-infrared region or a visible region.

Furthermore, the optical module and the electronic apparatus may be used as a concentration detection apparatus. In this case, infrared energy (infrared light) emitted from a substance is spectrally diffracted and analyzed by the wavelength variable interference filter, and thus a subject concentration in a sample is measured.

As described above, the optical filter device and the electronic apparatus which are examples of the MEMS device are applicable to any apparatus which spectrally diffracts predetermined light from incident light. In addition, the optical filter device can spectrally diffract a plurality of wavelengths with a single device as described above, and thus it is possible to measure spectra of a plurality of wavelengths and detect a plurality of components with high accuracy. Therefore, miniaturization of an optical module or an electronic apparatus can be promoted as compared with an apparatus of the related art which extracts a desired wavelength by using a plurality of devices, and thus the optical filter device or the electronic apparatus can be suitably used as, for example, a portable or in-vehicle electronic apparatus.

In the above description of the colorimetry apparatus 1, the gas detection apparatus 100, the food analysis apparatus 200, and the spectroscopic camera 300, an example in which the optical filter device 600 of the first embodiment is applied thereto has been described, and the invention is not limited thereto. Of course, the optical filter devices of the other embodiments may be applied to the colorimetry apparatus 1 and the like as described above.

In addition, a specific structure at the time of implementing the invention may be configured by combining the respective embodiments and modification examples as appropriate within the scope in which the object of the invention can be achieved, and may be changed to other structures as appropriate.

What is claimed is:

1. An optical filter device comprising:
   a wavelength variable interference filter that includes:
      a first substrate;
      a first reflective film fixed to the first substrate;
      a second substrate; and
      a second reflective film provided to the second substrate,
      wherein the first substrate has a first pair of major surfaces and a plurality of first side surfaces extending the between the first pair of major surfaces, and does not include a movable portion,
      the second substrate includes a movable portion, a holding portion that holds the movable portion and permits the movable portion to move, and the second reflective film is provided on the movable portion, and
      the first substrate and the second substrate are fixed with respect to each other so that the first reflective film and the second reflective film face each other;
   a casing that has an inner space storing the wavelength variable interference filter therein; and
   at least one adhesive fixing the wavelength variable interference filter to the casing,
   wherein the at least one adhesive is in contact with one single first side surface of the first substrate, the wavelength variable interference filter is fixed to the casing only by the at least one adhesive, and the at least one adhesive is configured to minimize deflection of the first substrate along of the major surfaces of the first pair of major surfaces of the first substrate that is perpendicular to the one single first side surface.

2. The optical filter device according to claim 1,
   wherein the first substrate includes a projecting portion that projects toward the casing to a greater extent than the second substrate in a plan view, and
   the at least one adhesive is provided at the projecting portion.

3. The optical filter device according to claim 1,
   wherein the one single first side surface is planar, and
   the at least one adhesive is provided on the one single first side surface.

4. The optical filter device according to claim 1,
   wherein the first substrate includes a connection terminal electrically connected to a casing terminal provided in the casing, the connection terminal being located at a part of an outer circumferential edge of the first substrate in a plan view, and
   the connection terminal is provided at the one single first side surface.

5. The optical filter device according to claim 1,
   wherein the at least one adhesive is provided at a single sub-portion of the one single first side surface.

6. The optical filter device according to claim 1,
   wherein the at least one adhesive is provided at a plurality of spaced apart sub-portions of the one single first side surface.

7. The optical filter device according to claim 1,
   wherein the casing includes a support portion that supports the wavelength variable interference filter with respect to the casing, and
   the at least one adhesive is provided between the one single first side surface and the support portion.

8. The optical filter device according to claim 1, wherein the casing includes a lid.

9. A MEMS device comprising:
   a MEMS element that includes:
      a first substrate; and
      a second substrate,
      wherein the first substrate has a first pair of major surfaces and a plurality of first side surfaces extending the between the first pair of major surfaces, and does not include a movable portion, and
      the second substrate includes a movable portion, and a holding portion that holds the movable portion and permits the movable portion to move;
   a casing that has an inner space storing the MEMS element therein; and
   at least one adhesive that fixes the MEMS element to the casing,
      wherein the at least one adhesive is in contact with one single first side surface of the first substrate, the MEMS element is fixed to the casing only by the at least one adhesive, and the at least one adhesive is configured to minimize deflection of the first substrate along of the major surfaces of the first pair of major surfaces of the first substrate that is perpendicular to the one single first side surface.

10. An optical filter device comprising:
    a casing including:
       a base, and
       a peripheral wall extending from the base to define an inner space; and
    a wavelength variable interference filter positioned within the inner space of the casing, the interference filter including:
       a first substrate,
       a first reflective film fixed to the first substrate,
       a second substrate, and
       a second reflective film provided on the second substrate,
       wherein the first substrate has a first pair of major surfaces and a plurality of first side surfaces extending the between the first pair of major surfaces, and does not include a movable portion, the second substrate includes a movable portion, a holding portion that holds the movable portion and permits the movable portion to move, and the second reflective film is provided on the movable portion, and the first substrate and the second substrate are fixed with respect to each other so that the first reflective film and the second reflective film face each other, and wherein at least one adhesive is in contact with one single first side surface of the first substrate, the wavelength variable interference filter is fixed to the peripheral wall of the casing only by the at least one adhesive, and the at least one adhesive is configured to minimize deflection of the first substrate along one of the major surfaces of the first pair of major surfaces of the first substrate that is perpendicular to the one single first side surface.

11. The optical filter device according to claim 10, wherein the first substrate includes a projection portion that projects toward the casing farther than the second substrate in a plan view, and the at least one adhesive in contact with the one single first side surface is provided at the projecting portion.

12. The optical filter device according to claim 10, wherein the at least one adhesive is provided at a single sub-portion of the one single first side surface.

13. The optical filter device according to claim 10, wherein the at least one adhesive is provided at a plurality of spaced apart sub-portions of the one single first side surface.

14. The optical filter device according to claim 10, wherein a pair of the plurality of first side surfaces are parallel, and the at least one adhesive is provided at each of the first side surfaces that are parallel.

15. The optical filter device according to claim 14, wherein the at least one adhesive is provided at each of the first side surfaces that are parallel are symmetrical.

16. The optical filter device according to claim 10, wherein a pair of the plurality of first side surfaces intersect with one another at a corner, and the at least one adhesive is provided at the corner.

17. An optical filter device comprising:
a wavelength variable interference filter that includes:
    a first substrate;
    a first reflective film fixed to the first substrate;
    a second substrate; and
    a second reflective film provided to the second substrate,
    wherein the first substrate has a first pair of major surfaces and a plurality of first side surfaces extending the between the first pair of major surfaces, and does not include a movable portion,
    the second substrate includes a movable portion, a holding portion that holds the movable portion and permits the movable portion to move, and the second reflective film is provided on the movable portion, and
    the first substrate and the second substrate are fixed with respect to each other so that the first reflective film and the second reflective film face each other;
a casing that has an inner space storing the wavelength variable interference filter therein; and
at least one adhesive fixing the wavelength variable interference filter to the casing,
    wherein the at least one adhesive is in contact with one single first side surface of the first substrate, the wavelength variable interference filter is fixed to the casing only by the at least one adhesive, the at least one adhesive is configured to minimize deflection of the first substrate along one of the major surfaces of the first pair of major surfaces of the first substrate that is perpendicular to the one single first side surface, and another one of the plurality of first side surfaces is spaced apart from the casing in a cross-sectional view of the optical filter device.

* * * * *